(12) United States Patent
Sugimoto et al.

(10) Patent No.: US 8,166,241 B2
(45) Date of Patent: Apr. 24, 2012

(54) METHOD OF IMPROVING EFFICIENCY OF CAPACITY OF VOLUME USED FOR COPY FUNCTION AND APPARATUS THEREOF

(75) Inventors: Sadahiro Sugimoto, Yokohama (JP); Kazuyoshi Serizawa, Tama (JP); Yoshiaki Eguchi, Yokohama (JP); Shunji Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 11/319,154

(22) Filed: Dec. 28, 2005

(65) Prior Publication Data

US 2007/0113004 A1    May 17, 2007

(30) Foreign Application Priority Data

Nov. 14, 2005 (JP) ................................. 2005-328729

(51) Int. Cl.
*G06F 12/08* (2006.01)
*G06F 12/16* (2006.01)
(52) U.S. Cl. ......... 711/112; 711/114; 711/161; 711/162
(58) Field of Classification Search .................. 711/112, 711/114, 161, 162
See application file for complete search history.

(56) References Cited

U.S. PATENT DOCUMENTS

| | | | | |
|---|---|---|---|---|
| 5,720,026 | A * | 2/1998 | Uemura et al. | 714/6 |
| 6,732,124 | B1 * | 5/2004 | Koseki et al. | 707/202 |
| 6,748,504 | B2 * | 6/2004 | Sawdon et al. | 711/162 |
| 6,880,052 | B2 * | 4/2005 | Lubbers et al. | 711/162 |
| 6,907,505 | B2 * | 6/2005 | Cochran et al. | 711/162 |
| 6,948,039 | B2 * | 9/2005 | Biessener et al. | 711/162 |
| 7,032,093 | B1 * | 4/2006 | Cameron | 711/170 |
| 7,111,138 | B2 * | 9/2006 | Higaki et al. | 711/162 |

(Continued)

FOREIGN PATENT DOCUMENTS

JP    2003-122509    4/2003

(Continued)

OTHER PUBLICATIONS

U.S. Appl. No. 11/202,033, filed Aug. 12, 2005, Yoshiaki Eguchi.
Hough, Geoffrey, "3PAR Thin Provisioning—Eliminating Allocated—But—Unused Storage and Accelerating ROI," White Paper, 3PAR Proprietary, Jun. 2003 [Internet Citation, Online] Jun. 30, 2003, XP002387038, retrieved from the Internet: URL:http://www.3par.com/documents/3PAR-tp-wp-01.2.pdf> [retrieved on Jun. 26, 2006] (in English). (14 pages, best available copy).

(Continued)

*Primary Examiner* — Yaima Campos
*Assistant Examiner* — Samuel Dillon
(74) *Attorney, Agent, or Firm* — Antonelli, Terry, Stout & Kraus, LLP.

(57) ABSTRACT

Provided is a computer system including: a host computer; a first storage system connected to the host computer; and a second storage system connected to the first storage system; in which the first storage system sets a first logical volume recognized by the host computer as a logical storage area; the first logical volume includes a plurality of first storage areas; a first real storage area on the first disk drive is allocated to at least one of the first storage areas. In the computer system, the second storage system sets a second logical volume corresponding to the first logical volume, and the first storage system transmits data stored in the first storage area allocated to the first storage area to the second storage system when the first real storage area is allocated to the first storage area.

19 Claims, 23 Drawing Sheets

U.S. PATENT DOCUMENTS

| | | | |
|---|---|---|---|
| 7,127,578 B2 * | 10/2006 | Nagata | 711/162 |
| 7,293,154 B1 * | 11/2007 | Karr et al. | 711/202 |
| 7,296,118 B2 * | 11/2007 | Nagata | 711/114 |
| 2003/0051111 A1 | 3/2003 | Nakano et al. | |
| 2003/0188114 A1 | 10/2003 | Lubbers et al. | |
| 2004/0260861 A1 | 12/2004 | Serizawa et al. | |
| 2004/0268070 A1 | 12/2004 | Hasegawa | |
| 2006/0101204 A1 * | 5/2006 | Bao | 711/114 |
| 2006/0161810 A1 * | 7/2006 | Bao | 714/6 |

FOREIGN PATENT DOCUMENTS

| | | |
|---|---|---|
| JP | 2005-11316 | 1/2005 |
| JP | 2005-018233 A | 1/2005 |
| JP | 2005-293469 | 10/2005 |

OTHER PUBLICATIONS

Office Action in JP 2005-328729, dispatched Apr. 26, 2011 (3 pgs, in Japanese); with concise explanation in English.

* cited by examiner

AREA MANAGEMENT INFORMATION
(ALLOCATION BITMAP)

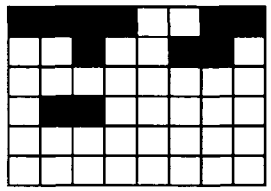

■ REAL AREA IS ALREADY ALLOCATED

☐ REAL AREA IS NOT ALLOCATED YET

*FIG. 7A*

COPY REQUIREMENT INFORMATION
(DIFFERENTIAL BITMAP)

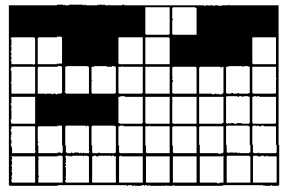

■ COPY REQUIRED

☐ COPY NOT REQUIRED

*FIG. 7B*

P-VOL
(VIRTUAL VOLUME)

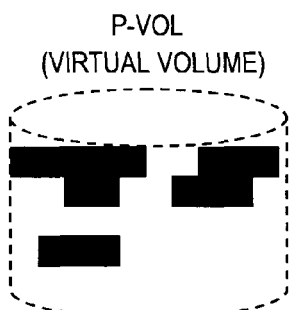

COPY →

S-VOL
(VIRTUAL VOLUME)

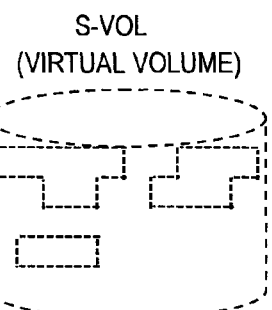

INITIAL COPY USING
DIFFERENTIAL BITMAP

REAL AREA IS ALLOCATED ONLY TO AREA
CORRESPONDING TO TARGET OF INITIAL COPY

*FIG. 7C*

COPY MANAGEMENT PROGRAM (MCU SIDE)

| VIRTUAL VOLUME ID ~141 | POOL ID ~142 | PARITY GROUP ID ~143 |
| --- | --- | --- |
| 0 | 0 | 1 |
| 1 | 2 | 2 |
| 2 | 2 | 10 |
| ⋮ | ⋮ | ⋮ |

*FIG. 18*

METHOD OF IMPROVING EFFICIENCY OF CAPACITY OF VOLUME USED FOR COPY FUNCTION AND APPARATUS THEREOF

CLAIM OF PRIORITY

The present application claims priority from Japanese patent application P2005-328729 filed on Nov. 14, 2005, the content of which is hereby incorporated by reference into this application.

BACKGROUND

This invention relates to a computer system including one or more storage systems, in particular, data copy in a virtualized environment in which a storage area is virtualized.

A storage system allocates a storage area having a predetermined capacity to a computer using the storage system. In order to effectively use a storage capacity of the storage system, it is desirable to allocate a storage area having a capacity required by the computer. With the increase in the amount of data handled by the computer, however, the capacity of the allocated storage area is sometimes found insufficient. On the other hand, if a storage area having a sufficiently large capacity is allocated in advance, the storage system can be prevented from suffering from a shortage of capacity. However, when the computer does not handle a large amount of data in practice, a part of the allocated storage area is not used to lower the usage efficiency of the storage capacity.

JP 2005-11316 A discloses a computer system including a virtualization system connected to a computer and a plurality of storage systems connected to the virtualization system. The virtualization system allocates a virtual volume of a predetermined size to the computer. Upon reception of an access request to the virtual volume from the computer, the virtualization system allocates an actual storage area (real area) of the storage system to the virtual volume according to the access request. When the size of the virtual volume is set sufficiently large, the virtual volume allows for the increase in the amount of data processed by the computer. Moreover, since a necessary real area is allocated when the virtual volume actually receives an access request from the computer, the storage capacity of the storage system can be efficiently used.

On the other hand, as techniques of protecting data stored in a storage system from system failures, disasters, or the like to continue operations, a local copy technique and a remote copy technique are known. The local copy is a technique of copying data in a storage area in a storage system to another storage area in the same storage system. The remote copy is a technique of copying data in a storage area in a storage system to a storage area in another storage system. The remote copy technique is described in JP 2003-122509 A, for example.

SUMMARY

In order to execute the remote copy or the local copy, it is necessary to keep not only a storage area of a source but also a storage area of a destination that stores the copied data. Normally, a capacity of the storage area kept as the destination is required to be the same as that of the storage area of the source. Therefore, when there is a free area in the storage area of the source, the capacity of the free area is doubled by keeping the storage area of the destination. Even in such a case, it is expected that the application of the virtualization technique disclosed in JP 2005-11316 A cited above allows the efficient use of the storage capacity of the storage system.

However, in the case where the above-described virtualization technique is applied to a computer system executing the remote copy or the like, the remote copy or the like cannot be normally executed when a pool capacity of the virtual volume is insufficient. Moreover, when a copy pair is to be created, the storage areas of the source are entirely copied to the destination. Therefore, a real area is allocated to the entire virtual volume of the destination. Furthermore, even when there is a real area that is no longer necessary by the execution of a pair operation, the real area is not released. Accordingly, the unnecessary real area cannot be reused for another virtual volume. In this manner, even when the conventional virtualization technique is applied to the computer system that executes the remote copy or the like, the storage capacity of the storage system cannot be sufficiently efficiently used.

According to an exemplary embodiment of this invention, there is provided a computer system including: a host computer; a first storage system connected to the host computer through a network; and a second storage system connected to the first storage system through the network, in which: the first storage system includes: at least one first interface connected to the network; a first processor connected to the at least one first interface; a first memory connected to the first processor; and at least one first disk drive that stores data requested to be written from the host computer, and sets a first logical volume recognized by the host computer as a logical storage area; the first logical volume includes a plurality of first storage areas; a first real storage area on the first disk drive is allocated to at least one of the first storage areas; the second storage system includes: at least one second interface connected to the network; a second processor connected to the at least one second interface; a second memory connected to the second processor; and at least one second disk drive that stores data transmitted from the first storage system, and sets a second logical volume corresponding to the first logical volume; and the first processor decides whether the first real storage area is allocated to each of the first storage areas, and, when it is decided that the first real storage area is allocated to the first storage area, data stored in the first real storage area allocated to the first storage area is transmitted to the second storage system through the first interface.

According to an aspect of this invention, even in a computer system that executes remote copy or local copy, a storage capacity of a storage system can be efficiently used.

BRIEF DESCRIPTION OF THE DRAWINGS

The present invention can be appreciated by the description which follows in conjunction with the following figures, wherein:

FIG. 7A is an explanatory view showing an example of the allocation bitmap when the initial copy process is executed in this embodiment of this invention;

FIG. 7B is an explanatory view showing an example of the differential bitmap created by the differential bitmap creating process according to this embodiment of this invention;

FIG. 7C is an explanatory view showing an example of the copy process in the initial copy process according to this embodiment of this invention;

FIG. 18 is an explanatory view showing the virtual volume configuration information according to this embodiment of this invention.

DETAILED DESCRIPTION OF PREFERRED EMBODIMENT

Hereinafter, an embodiment of this invention will be described with reference to the accompanying drawings.

Figure 1:
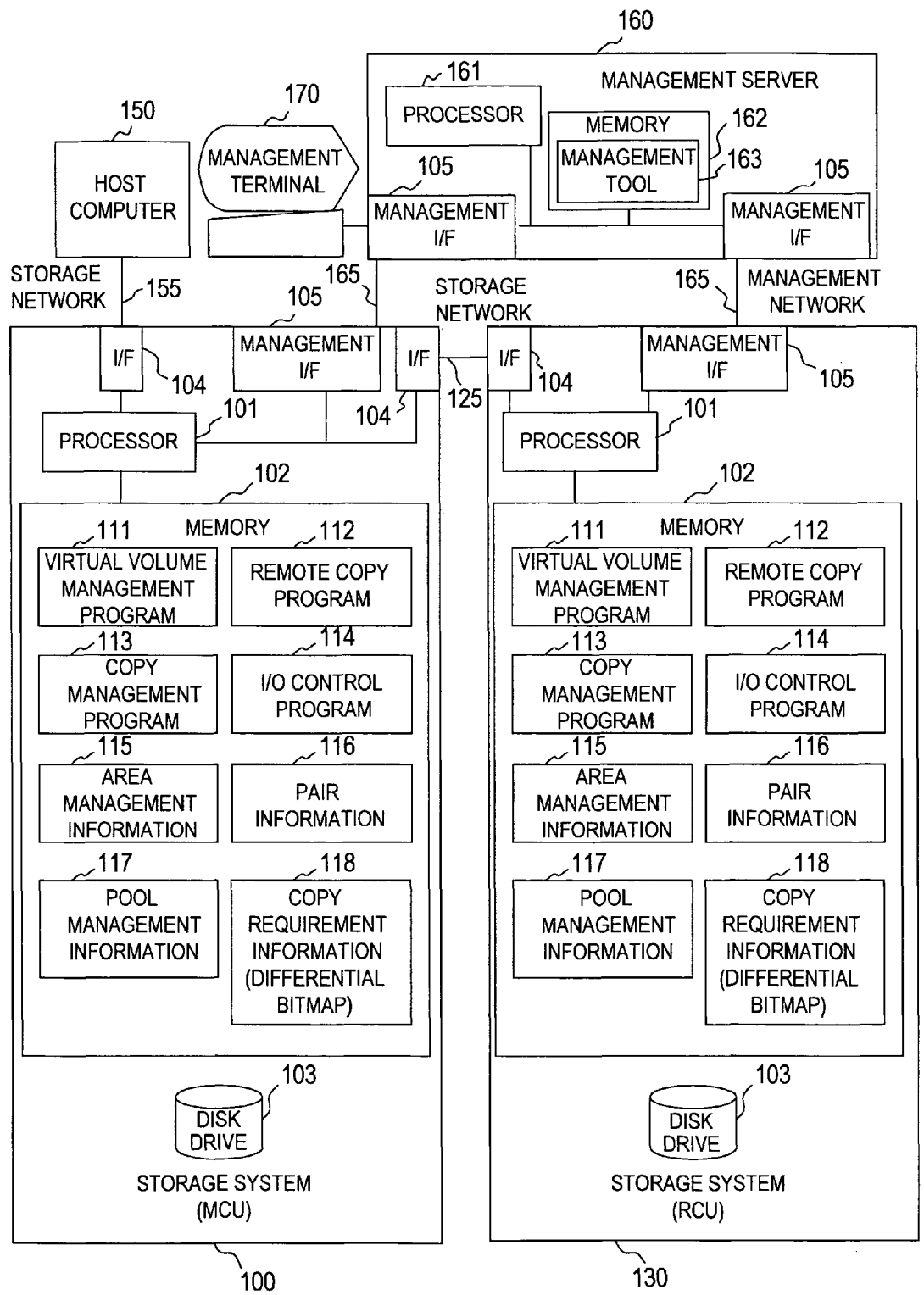
FIG. 1 is a block diagram showing a configuration of a computer system according to the embodiment of this invention.

FIG. 1 is a block diagram showing a configuration of a computer system according to the embodiment of this invention.

The computer system according to this embodiment of this invention includes storage systems 100 and 130, a host computer 150, a management server 160, and a management terminal 170. The storage system 100 is connected to the host computer 150 through a storage network 155. The storage system 130 is connected to the storage system 100 through a storage network 125. The management server 160 is connected to the storage systems 100 and 130 through a management network 165.

The host computer 150 uses the storage system 100. The host computer 150 executes an application program (not shown) so as to issue a data write request or a data read request to the storage system 100 as needed.

The management server 160 is a computer that manages the storage systems 100 and 130. The system management serer 160 includes a processor 161, a memory 162, and management interfaces (management I/Fs) 105, which are interconnected.

The processor 161 executes various programs stored in the memory 162.

The memory 162 is, for example, a semiconductor memory. The memory 162 stores programs executed by the processor 161 and the like. The memory 162 according to this embodiment stores at least a management tool 163. The management tool 163 is a program executed to manage the storage system 100 and the like. The management tool 163 will be described below.

The management I/Fs 105 are interfaces connected to the management network 165. The management I/Fs 105 of the management server 160 communicate with the storage system 100 and the like.

The management server 160 shown in FIG. 1 is connected to the storage systems 100 and 130 through the management network 165. However, the management server 160 in this embodiment is not required to be connected to the storage system 130 through the management network 165. This is because, as described below, the storage systems 100 and 130 are sometimes installed at the locations geographically separated from each other. In such a case, the management server 160 manages the storage system 130 through the management network 165, the storage system 100, and the storage network 125.

The management terminal 170 is used by a system administrator to operate the management server 160. The management terminal 170 may include an input device (not shown), a display screen (not shown), and the like. A single computer may serve as the management server 160 and the management terminal 170.

The storage system 100 is a storage apparatus used by the host computer 150. Specifically, upon reception of a write request of data from the host computer 150, the storage system 100 stores the data in a disk drive 103 described below. On the other hand, upon reception of a read request of data from the host computer 150, the storage system 100 reads the data from the disk drive 103 to respond to the host computer 150.

The storage system 100 according to this embodiment includes a processor 101, a memory 102, the disk drive 103, interfaces (I/Fs) 104, and the management I/F 105, which are interconnected.

The processor 101 executes various programs stored in the memory 102.

The memory 102 is, for example, a semiconductor memory. The memory 102 stores various programs executed by the processor 101 and information used by the programs. The programs and the information will be described in detail below.

The disk drive 103 is a device that stores data written by the host computer 150. The disk drive 103 according to this embodiment is, for example, a hard disk drive. The storage system 100 according to this embodiment may include a plurality of disk drives 103. The plurality of disk drives 103 may constitute RAID (Redundant Arrays of Inexpensive Disks). In this case, a predetermined number of disk drives 103 may constitute a parity group (not shown). The parity group will be described below.

The storage system 100 can set a logical volume having an arbitrary storage capacity (not shown). The logical volume is a logical storage area that the host computer 150 recognizes as one storage device.

Each of the I/Fs 104 is connected to the storage network 125 or 155 so as to communicate with the host computer 150 or another storage system. Although two I/Fs 104 are shown in FIG. 1, the storage system 100 may also include three or more I/Fs 104.

The management I/F 105 is an interface connected to the management network 165. The management I/F 105 of the storage system 100 communicates with the management server 160.

The storage system 100 may also include a cache for temporarily storing data (not shown).

The storage system 130 stores a copy of the data stored in the storage system 100. Specifically, when the host computer 150 writes data in a logical volume of the storage system 100, the data is transmitted from the storage system 100 through the I/Fs 104 and the storage network 125 to the storage system 130. The storage system 130 receives the transmitted data so as to store it in a logical volume. In other words, the data written in the logical volume of the storage system 100 is copied to the logical volume of the storage system 130. When the data stored in the storage system 100 is updated by the host computer 150, the updated data is transmitted from the storage system 100 to the storage system 130 in the same manner so as to be stored in the storage system 130. The above-described operation of copying data stored in one storage system to another storage system is called remote copy.

The storage system 130 may be installed at a location physically separated from the storage system 100. In this case, even when the storage system 100 is stopped by a disaster such as an earthquake, the use of the storage system 130 can prevent the data from being lost and the system from being completely stopped.

The storage system 100, which is one of the storage systems executing the remote copy and is closer to the host computer 150 (in other words, is an upstream storage system), is also referred to as a main control unit (MCU). On the other hand, the storage system 130, which is far from the host computer 150 (in other words, is a downstream storage system), is also referred to as a remote control unit (RCU).

Since the configuration of the storage system 130 is the same as that of the storage system 100, the description thereof is herein omitted. Although only one I/F 104 is shown in the storage system 130 shown in FIG. 1, the storage system 130 may include a plurality of I/Fs 104. At least one of the plurality of I/Fs 104 may be connected to a host computer (not shown), which is different from the host computer 150.

The storage system 100 can also store the copy of the data stored in the logical volume in the storage system 100 in another logical volume in the same storage system 100. The operation of copying data within one storage system is called local copy. The storage system 130 can also execute the same local copy.

In the remote copy and the local copy, the set of a logical volume of a source and a logical volume of a destination is referred to as a pair. In each pair, the logical volume closer to the host computer 150 (in other words, the upstream logical volume) is also referred to as a primary logical volume (P-VOL). On the other hand, the logical volume far from the host computer 150 (in other words, the downstream logical volume) is also referred to as a secondary logical volume (S-VOL).

Each pair can be put into various states.

The state in which the same data is stored in the P-VOL and the S-VOL (in other words, the data is duplicated) as a result of copy of the data is a "synchronous" state. When the data in the P-VOL is updated in the "synchronous" state, the updated data is copied to the S-VOL. The copy of the updated data as described above is also referred to as update copy. Since such update copy is executed for the pair in the "synchronous" state, the "synchronous" state is also referred to as an "update copying" state.

The state in which data copy is stopped is referred to as a "suspend" state. In the pair in the "suspend" state, the S-VOL sometimes stores data different from that stored in the P-VOL.

The state in which initial copy is being executed is referred to as an "initial copying" state. The initial copy process will be described in detail below.

In the "suspend" state and the "initial copying" state, differential management using a differential bitmap is executed. For this reason, the "suspend" state and the "initial copying" state are also referred to as a "differential management executing" state. The differential bitmap and a method of using it will be described in detail below.

The storage system 100 and the like can perform various operations on each pair.

An operation "split" is executed so as to modify the state of the pair in the "synchronous" state to the "suspend" state. Once the split is executed, data is no longer copied from the P-VOL to the S-VOL.

An operation "resync" is executed to change the state of the pair in the "suspend" state to the "synchronous" state. When the resync is executed, a part of the data stored in the P-VOL, which is different at least from that stored in the S-VOL, is copied to the S-VOL. As a result, the S-VOL stores the same data as that stored in the P-VOL.

An operation "restore" is executed to change the state of the pair in the "suspend" state to the "synchronous" state. When the restore is executed, a part of the data stored in the S-VOL, which is different at least from that stored in the P-VOL, is copied to the P-VOL. As a result, the P-VOL stores the same data as that stored in the S-VOL. The operation restore is also referred to as "reverse-resync".

When associated data are stored in a plurality of logical volumes belonging to different pairs and one of the pairs is brought into the "suspend" state, the other pair has to be put into the "suspend" state in some cases. An aggregate of a plurality of pairs having such a relation is referred to as a volume group. In particular, a volume group, for which the order of writing has to be guaranteed, is referred to as a "consistency group (CTG)". For example, when two pairs form the CTG, data sequentially written into two P-VOLs contained in the CTG have to be copied to the S-VOLs paired with the respective P-VOLs in the same order as the order of writing.

Next, a virtualization function provided for the storage system 100 and the like will be described.

The system administrator can set a virtual volume having an arbitrary capacity in the storage system 100 or the like. The virtual volume is a virtual logical volume that the storage system 100 and the like allow the host computer 150 to recognize.

At the time when the system administrator sets the virtual volume, a real storage area (in other words, a physical storage area on the disk drive 103; hereinafter, referred to as a real area) is not allocated to a storage area (for example, a logical block) in the virtual volume. When a data write request to a storage area in the virtual volume is issued from the host computer 150 and a real area is not allocated to the storage area, the storage system 100 or the like allocates a real area to the storage area. Then, data is stored in the allocated real area.

In the following description, "data in a storage area" and "data stored in a storage area" mean data stored in a real area corresponding to the storage area. An operation of "storing data in a storage area" means storage of data in a real area corresponding to the storage area.

As described above, by the technique of allocating a real area only to a storage area to which a write request is issued from the host computer 150, the real area having a finite capacity on the disk drive 103 can be effectively used.

The system administrator has to keep the real area to be allocated to the virtual volume. The thus kept real area is referred as a pool. When a write request to a storage area in the virtual volume, to which a real area is not allocated yet, is issued from the host computer 150, a real area in a pool corresponding to the virtual volume, which is not allocated to the virtual volume yet, is allocated to the storage area. When all the real areas in the pool are allocated to the virtual volume, a real area can no longer be allocated to the virtual volume unless the system administrator adds a new real area to the pool.

Next, programs and the like stored in the memory 102 according to this invention will be described.

The memory 102 according to this embodiment stores a virtual volume management program 111, a remote copy program 112, a copy management program 113, an I/O control program 114, area management information 115, pair information 116, pool management information 117, and copy requirement information 118.

The virtual volume management program 111 is a program that manages the virtual volume set in the storage system 100 and the like. The virtual volume management program 111 executes at least an operating pool capacity checking process and an operating pool capacity adding process (a method 1). The processes will be described in detail below.

The remote copy program 112 is a program that executes remote copy between the storage systems 110 and 130. Since the remote copy executed by the remote copy program 112 is the same as the conventional remote copy, the detailed description thereof is herein omitted.

The copy management program 113 manages the execution of the remote copy and the local copy. The copy management program 113 executes at least an update copy management process, an initial copy process, a copy process, a differential bitmap creating process, a resync process, a merging process of pools in a volume group, a pool capacity adding process for pair creation, an operating pool capacity adding process (a method 2), and a pool capacity adding process for resync. The processes will be described in detail below.

The I/O control program 114 is a program for processing an I/O request (in other words, a write request or a read request) from the host computer 150. The I/O control program 114 executes at least an I/O process. The I/O process will be described in detail below with reference to FIG. 8.

The area management information 115 is information for managing a storage area of each virtual volume. Specifically, the area management information 115 includes an allocation bitmap indicating whether or not a real area is allocated to each storage area in each virtual volume and a mapping table (not shown) indicating the correlation between a storage area and a real area for the storage area to which a real area is allocated.

Each bit stored in the allocation bitmap corresponds to a storage area in a virtual volume, which has a predetermined size. When a real area is allocated to a storage area of the virtual volume, a bit corresponding to the storage area is "ON (valid)". On the other hand, when a real area is not allocated to a storage area of a virtual volume, a bit corresponding to the storage area is "OFF (invalid)". For example, a bit value "1" may correspond to "ON", while a bit value "0", may correspond to "OFF". In the following description, each bit stored in the allocation bitmap (in other words, a bit indicating whether or not a real area is allocated to a storage area in a virtual volume) is referred to as an "allocation bit". One storage area corresponding to one allocation bit corresponds to, for example, one or a plurality of logical blocks.

The pair information 116 manages a pair created in the storage system 100 or the like. Specifically, the pair information 116 includes, for each pair, identifiers of the P-VOL and the S-VOL, and information indicating a state of the pair.

The pool management information 117 manages a pool corresponding to a virtual volume. Specifically, the pool management information 117 includes a list (not shown) indicating a real area kept as a pool and a counter (not shown) indicating the amount of a free area. Herein, the free area is a real area that is kept as a pool but is not allocated to a virtual volume yet. The amount of the free area is, for example, the number of logical blocks in the free area. A free capacity in the pool can be calculated from a value of the counter and the capacity of the logical blocks.

The copy requirement information 118 indicates a storage area in the logical volume, whose data is required to be copied at the time of execution of resync. Specifically, the copy requirement information 118 includes a differential bitmap composed of information (bits) indicating whether data in each storage area is required to be copied or not. Each bit in the differential bitmap normally indicates whether or not a write request has been issued to each storage area when the pair is in the suspend state.

When the pair is in the "suspend" state, data written in the P-VOL (data newly written or updated data) is not copied to the S-VOL. Therefore, when the "resync" is executed for the pair in the "suspend" state, the data stored in the S-VOL is required to be the same as that in the P-VOL. For this purpose, the data in all the storage areas of the P-VOL may be copied to the S-VOL. However, such copy of all the areas requires a long time and burdens the hardwares such as the processor and the network. Therefore, when executing the resync, the copy management program 113 refers to the differential bitmap.

Each bit stored in the differential bitmap on the side of the MCU (in other words, the differential bitmap contained in the copy requirement information 118 of the storage system 100) corresponds to a storage area of a predetermined size on the P-VOL. When the pair to which the P-VOL belongs is in the "synchronous" state, all the bits in the differential bitmap are "OFF (invalid)" (for example, "0"). When the pair to which the P-VOL belongs is in the "suspend" state and the host computer 150 issues a data write request to the P-VOL, the I/O control program 114 updates the bit corresponding to the storage area in which the data is written to "ON (valid)" (for example, "1"). In the following description, each bit stored in the differential bitmap is referred to as a "differential bit". One storage area corresponding to one differential bit corresponds to, for example, one or a plurality of logical blocks.

On the other hand, the copy requirement information 118 of the storage system 130 on the side of the RCU contains a similar differential bitmap. Specifically, the differential bitmap on the RCU side has differential bits corresponding to storage areas of the S-VOL. When the pair to which the S-VOL belongs is in the suspend state and a host computer different from the host computer 150 (not shown) issues a data write request to the S-VOL, a differential bit corresponding to the storage area in which the data is written is updated to "ON".

Thereafter, when the "resync" is executed for the pair, the copy management program 113 refers to the differential bitmaps on the MCU side and the RCU side so as to copy only the data in the storage area corresponding to the differential bit having the value "ON" in any of the bitmaps from the P-VOL to the S-VOL.

As a result, only the data written (or the data possibly written) while the pair is being in the "suspend" state is copied from the P-VOL to the S-VOL. Consequently, the amount of time required for copy can be reduced to decrease the burden on the hardwares.

When the "restore" is executed for the pair, the differential bitmaps on the MCU side and the RCU side are similarly referred to. Then, only the data in the storage area corresponding to the differential bit having the value "ON" in any of the bitmaps is copied from the S-VOL to the P-VOL.

Furthermore, the differential bitmap according to this embodiment is referred to by the copy management program 113 even when the initial copy process is executed. The initial copy process will be described in detail below with reference to FIG. 4 and FIG. 5.

Next, the process executed by each of the programs will be described below. The following description is given as a procedure executed by each of the programs. In practice, however, the procedures are executed by the processor 101 executing each of the programs.

Figure 2:
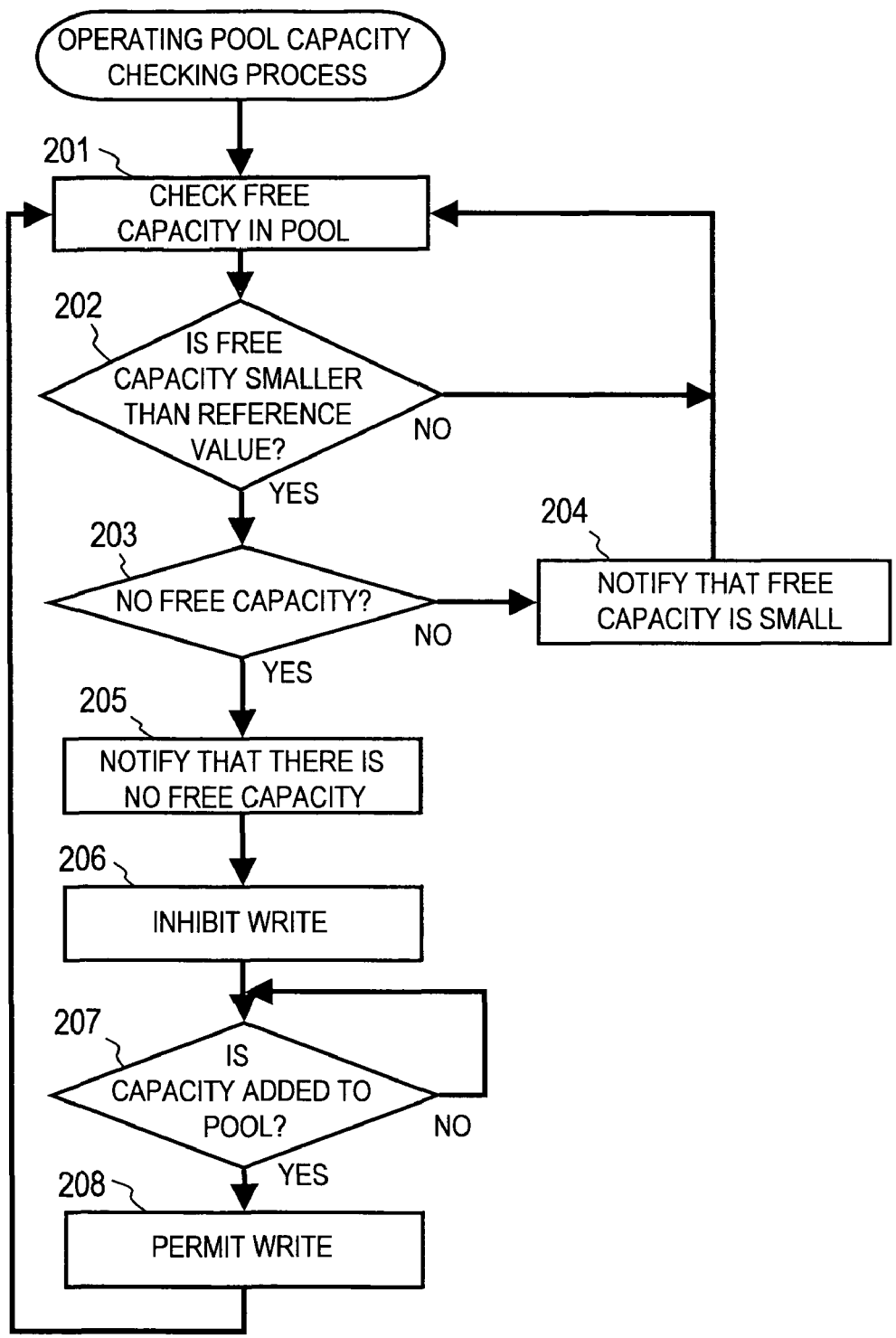
FIG. 2 is a flowchart of the operating pool capacity checking process executed by the virtual volume management program according to the embodiment of this invention.

FIG. 2 is a flowchart showing the operating pool capacity checking process executed by the virtual volume management program 111 according to the embodiment of this invention.

The operating pool capacity checking process shown in FIG. 2 is executed by the virtual volume management program 111 of the storage system 100 on the MCU side when the remote copy pair is in the "synchronous" state (in other words, the update copy is executed when the data in the P-VOL is updated).

Upon start of the operating pool capacity checking process, the virtual volume management program 111 first checks a free capacity in the pool on the MCU side (step 201). Specifically, the virtual volume management program 111 refers to the pool management information 117 to calculate the free capacity in the pool.

Next, the virtual volume management program 111 decides whether or not the calculated free capacity is smaller than a predetermined reference value (step 202). The reference value may be preset by the system administrator.

In the step 202, when it is decided that the calculated free capacity is not smaller than the predetermined reference value, the pool has a sufficient free capacity. In this case, it is necessary neither to add a free capacity to the pool nor to inhibit the write to the virtual volume. Therefore, the process returns to the step 201 to continue checking the free capacity in the pool.

On the other hand, when it is decided in the step 202 that the calculated free capacity is smaller than the predetermined reference value, the virtual volume management program 111 decides whether or not the pool does not have the calculated free capacity (in other words, the free capacity is zero) (step 203).

In the step 203, when it is decided that the pool has the calculated free capacity, the pool has the free capacity but the free capacity is not sufficient. In this case, it is desirable to add a free capacity to the pool but it is not necessary to inhibit the write to the virtual volume. Therefore, the virtual volume management program 111 notifies the copy management program 113 that the free capacity is small (step 204). This is for notifying the system administrator of the small free capacity to urge the system administrator to add a capacity to the pool. Thereafter, the process returns to the step 201 so as to continue checking the free capacity in the pool.

On the other hand, when it is decided in the step 203 that the pool does not have the calculated free capacity, the pool does not have any free capacity. Therefore, it is no longer possible to write data to the virtual volume corresponding to the pool. In this case, the virtual volume management copy program 111 notifies the copy management program 113 that there is no free capacity (step 205). Then, the virtual volume management program 111 inhibits the write to the virtual volume (step 206).

Next, the virtual volume management program 111 decides whether or not a pool is added (step 207).

In the step 207, when it is decided that a pool is added, the pool has a new free capacity. Therefore, it is possible to write new data to the virtual volume. Accordingly, the virtual volume management program 111 permits data write to the virtual volume (step 208) and then returns to the step 201.

On the other hand, when it is decided in the step 207 that the pool is not added, there is still no free capacity in the pool. In other words, since it is not possible to write new data to the virtual volume, the process returns to the step 207.

FIGS. 3A to 3E are flowcharts showing the update copy management process executed by the copy management program 113 according to this embodiment of this invention.

The update copy management process shown in FIGS. 3A to 3E is executed by the copy management program 113 of the storage system 100 on the MCU side when the remote copy pair is in the "synchronous" state.

Figure 3A:
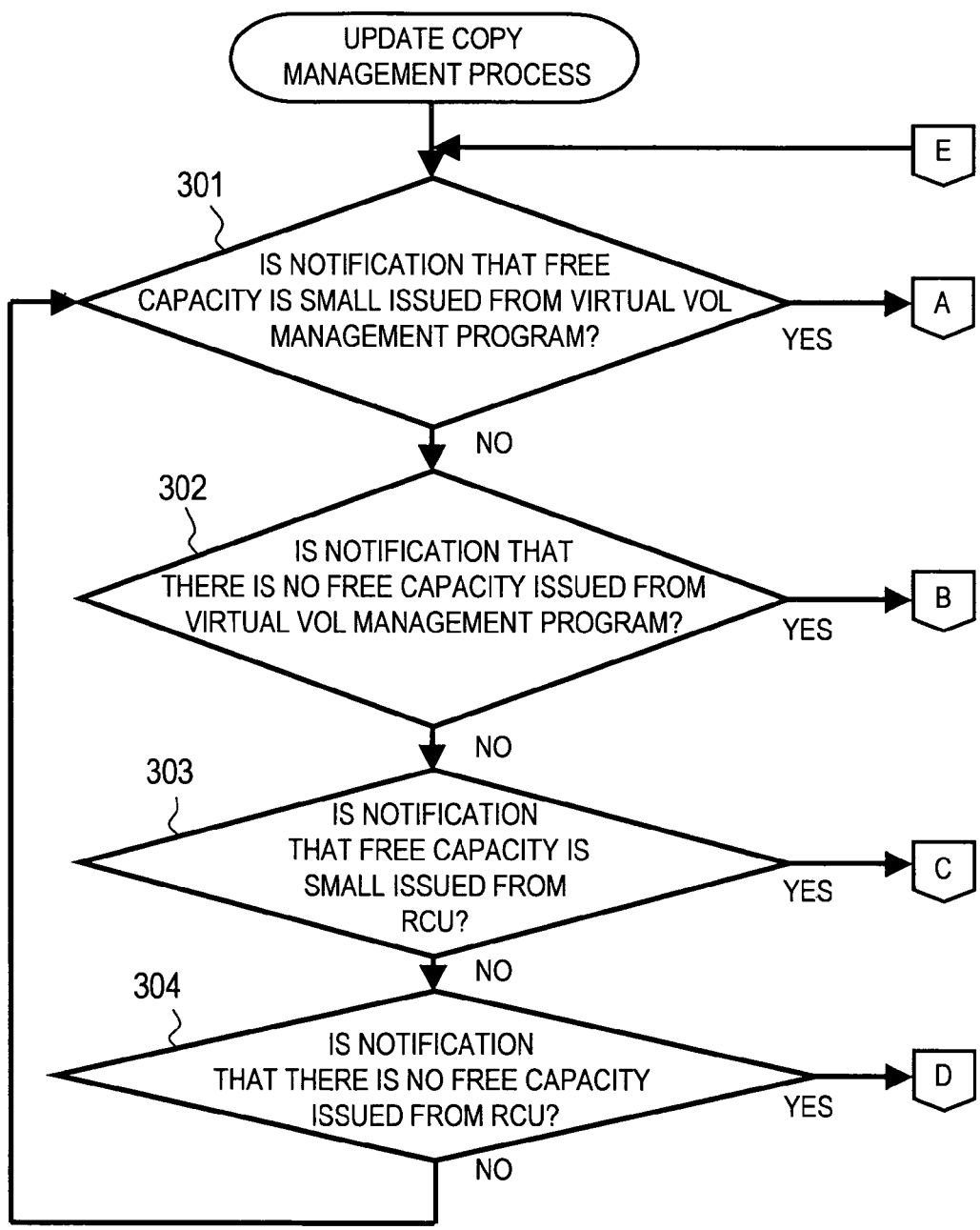
FIG. 3A is a flowchart showing the update copy management process executed by the copy management program according to this embodiment of this invention.

Upon start of the execution of the update copy management process, the copy management program 113 first decides whether or not the virtual volume management program (virtual VOL management program) 111 notifies the copy management program 113 that the free capacity in the pool is small (step 301 of FIG. 3A). The notification is performed in the step 204 shown in FIG. 2 by the virtual volume management program 111 of the storage system 100 on the MCU side.

Figure 3B:
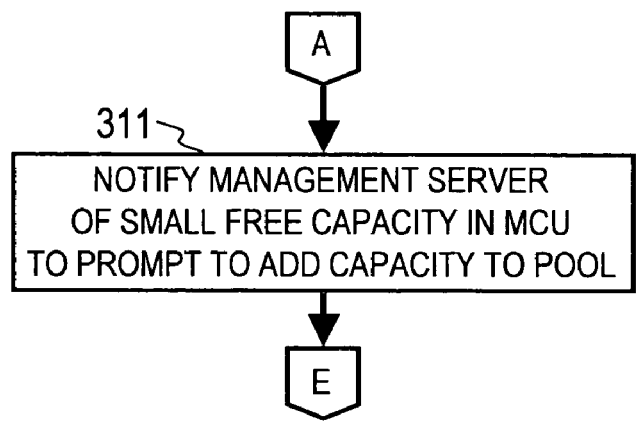
FIG. 3B is a flowchart showing the update copy management process executed by the copy management program according to this embodiment of this invention.

In the step 301, when it is decided that the copy management program 113 is notified that the free capacity in the pool is small, the copy management program 113 notifies the management server 160 that the free capacity in the pool on the MCU side is small (step 311 of FIG. 3B). This is for urging the system administrator to add a free capacity in the pool on the MCU side. Thereafter, the process returns to the step 301.

On the other hand, when it is decided in the step 301 that the copy management program 113 is not notified that the free capacity in the pool is small, there is a sufficient free capacity in the pool on the MCU side or there is no free capacity in the pool on the MCU side. In this case, the copy management program 113 decides whether or not it is notified by the virtual volume management program 111 that there is no free capacity in the pool (step 302 of FIG. 3A). The notification is made by the virtual volume management program 111 of the storage system 100 on the MCU side in the step 205 shown in FIG. 2.

In the step 302, when it is decided that the notification that there is no free capacity in the pool is made, it is no longer possible to write data in the virtual volume corresponding to the pool on the MCU side. When the virtual volume is contained the consistency group (CTG), the copy management program 113 puts the entire consistency group into the "suspend" state so as to maintain data consistency (step 321 of FIG. 3C). Specifically, the operation "split" is performed for all the pairs contained in the consistency group.

Figure 3C:
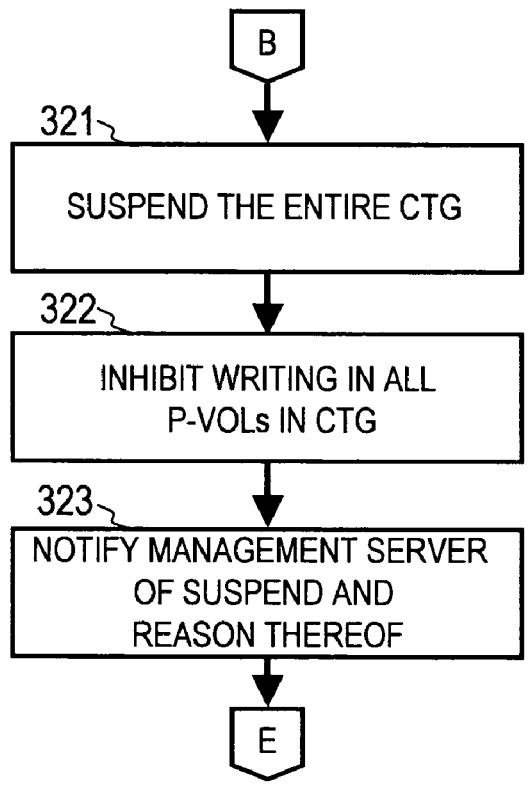
FIG. 3C is a flowchart showing the update copy management process executed by the copy management program according to this embodiment of this invention.

Furthermore, the copy management program 113 inhibits the write of data to all the P-VOLs contained in the consistency group (step 322 of FIG. 3C).

Next, the copy management program 113 notifies the management server 160 that the entire consistency group is in the "suspend" state and the reason thereof (step 323 of FIG. 3C). The reason is that there is no free capacity in the pool on the MCU side. Thereafter, the process returns to the step 301.

On the other hand, when it is decided in the step 302 that the notification that there is no free capacity in the pool is not made, there is a sufficiently large free capacity in the pool on the MCU side. In this case, the copy management program 113 decides whether or not a notification that there is only a small free capacity in the pool is made from the storage system 130 on the RCU side (step 303 of FIG. 3A).

Figure 3D:
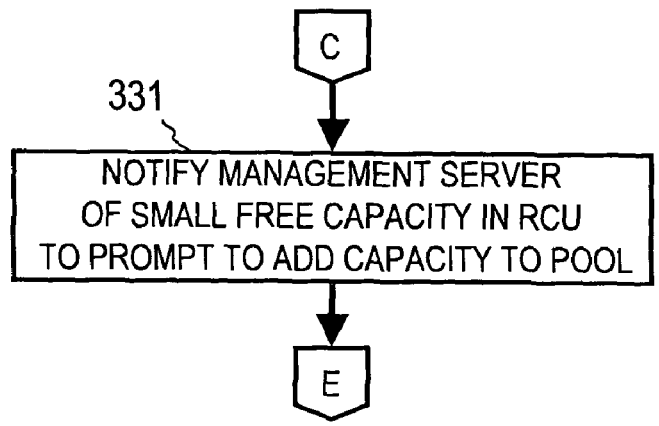
FIG. 3D is a flowchart showing the update copy management process executed by the copy management program according to this embodiment of this invention.

In the step 303, when it is decided that the notification that there is only a small free capacity in the pool is made, the copy management program 113 notifies the management server 160 that there is only a small free capacity in the pool on the RCU side (step 331 of FIG. 3D). This is for urging the system administrator to add a free capacity in the pool on the RCU side. Thereafter, the process returns to the step 301.

On the other hand, when it is decided in the step 303 that the notification that there is only a small free capacity in the pool is not made, there is a sufficiently large free capacity in the pool on the RCU side or there is no free capacity in the pool on the RCU side. In this case, the copy management program 113 decides whether or not a notification that there is no free capacity in the pool is made from the storage system 130 on the RCU side (step 304 of FIG. 3A).

In the step 304, when it is decided that the notification that there is no free capacity in the pool is made, it is no longer possible to write data in the virtual volume corresponding to the pool on the RCU side. When the virtual volume is contained the consistency group (CTG), the copy management program 113 puts the entire consistency group into the "suspend" state so as to maintain data consistency (step 341 of FIG. 3E).

Figure 3E:
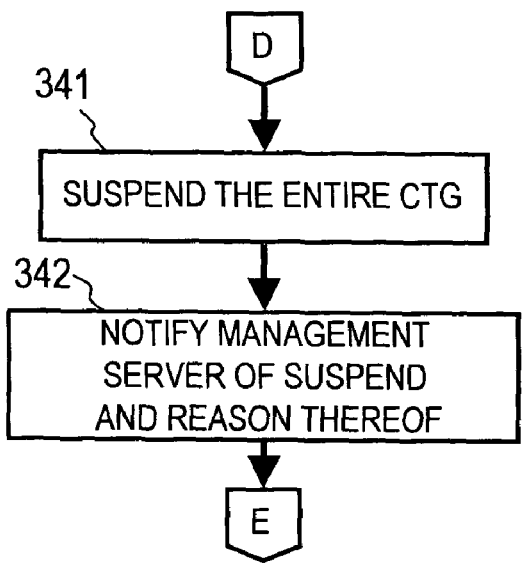
FIG. 3E is a flowchart showing the update copy management process executed by the copy management program according to this embodiment of this invention.

Next, the copy management program 113 notifies the management server 160 that the entire consistency group is brought into the "suspend" state and the reason thereof (step 342 of FIG. 3E). In this case, the reason is that there is no free capacity in the pool on the RCU side. Thereafter, the process returns to the step 301.

On the other hand, when it is decided in the step 304 that the notification that there is no free capacity in the pool is not made, there is a sufficiently large free capacity in the pool on the RCU side. In this case, the process returns to the step 301.

Figure 4:
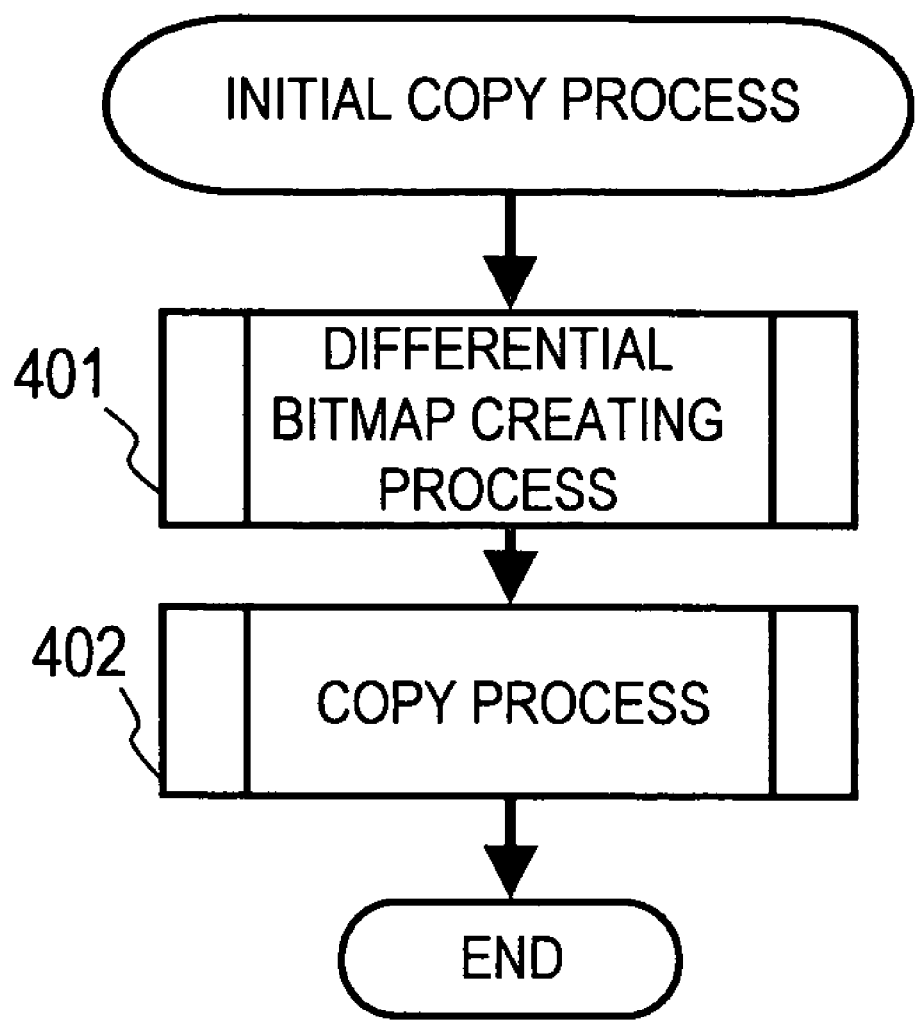
FIG. 4 is a flowchart showing the initial copy process executed by the copy management program according to this embodiment of this invention.

FIG. 4 is a flowchart showing the initial copy process executed by the copy management program 113 according to this embodiment of this invention.

The initial copy process is executed to create a new pair. When a new pair is to be created, the system administrator designates a source (P-VOL) and a destination (S-VOL) of the new pair to be created. At this time, the S-VOL does not store the same data as that stored in the P-VOL (normally, the S-VOL is empty). Then, in the initial copy process, the data stored in the P-VOL are sequentially copied to the S-VOL. When the initial copy is terminated, the same data as that in the P-VOL is stored in the S-VOL.

In a conventional initial copy process, data in all the storage areas in the P-VOL are copied to the S-VOL. Therefore, even when the P-VOL is a virtual volume and a real area is allocated only to a part of the storage areas in the P-VOL, real areas are allocated to all the volumes in the S-VOL once the conventional initial copy process is executed. In other words, even when a real area on the MCU side is not allocated to the storage area of the P-VOL, the real area on the RCU side is allocated to the storage area in the S-VOL corresponding to the storage area. As a result, the real area on the RCU side cannot be efficiently used.

In the initial copy process according to this embodiment, the differential bitmap of the copy requirement information 118 is referred to so as to efficiently use the real area on the RCU side. Hereinafter, the initial copy process according to this embodiment will be described with reference to FIG. 4 to FIG. 7.

The initial copy process shown in FIG. 4 is executed by the copy management program 113 of the storage system 100 on the MCU side so as to create a remote copy pair.

Upon start of the execution of the initial copy process, the copy management program 113 first executes a differential bitmap creating process (step 401). The differential bitmap creating process will be described in detail below with reference to FIG. 5.

Next, the copy management program 113 executes a copy process (step 402). The copy process will be described in detail below with reference to FIG. 6.

As described above, the initial copy process is terminated.

Figure 5:
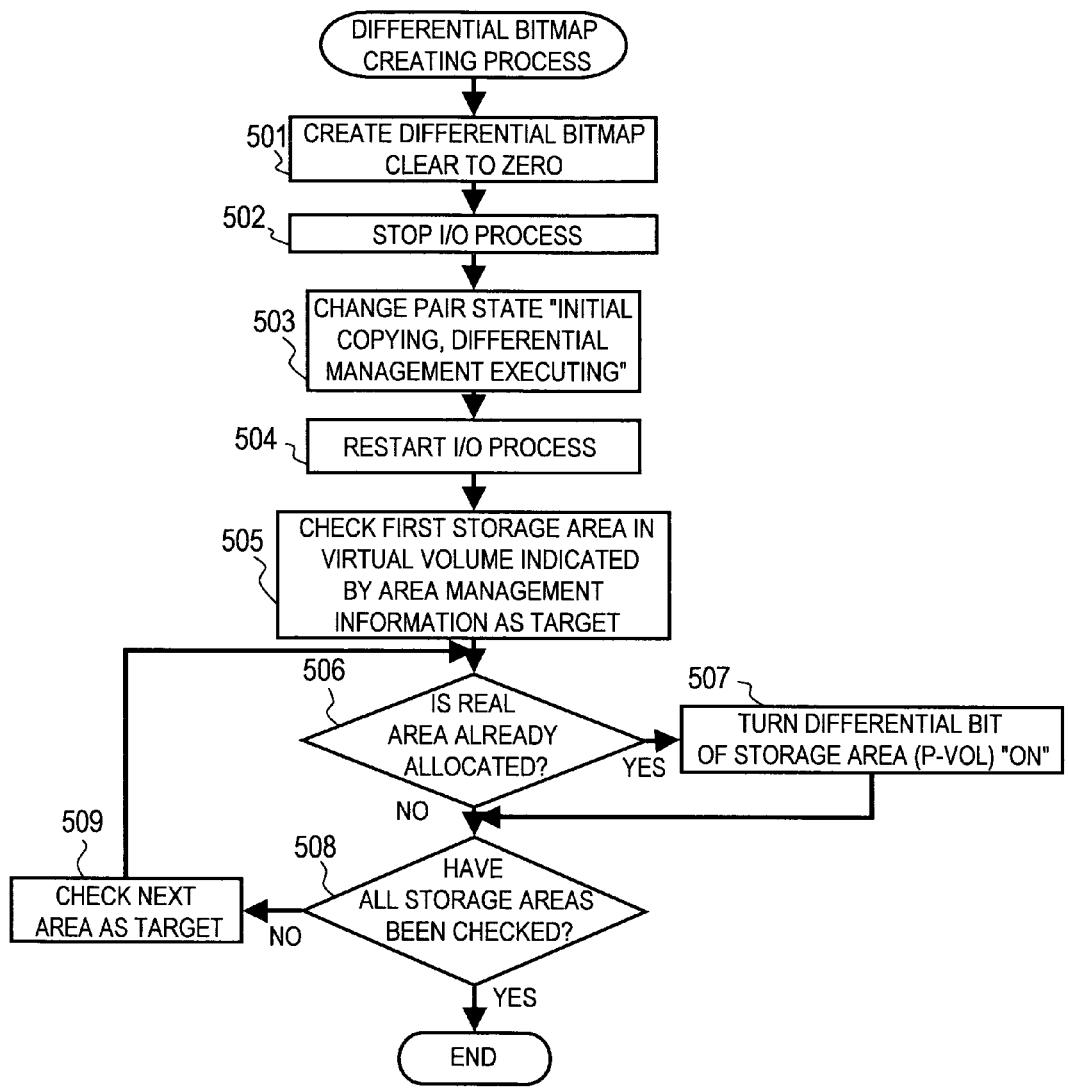
FIG. 5 is a flowchart showing the differential bitmap creating process executed by the copy management program according to this embodiment of this invention.

FIG. 5 is a flowchart showing the differential bitmap creating process executed by the copy management program 113 according to this embodiment of this invention.

The differential bitmap creating process shown in FIG. 5 is executed by the copy management program 113 of the storage system 100 on the MCU side in the step 401 shown in FIG. 4.

Upon start of the differential bitmap creating process, the copy management program 113 creates a new differential bitmap corresponding to the P-VOL so as to clear all the differential bits to zero (step 501). Specifically, at this time, the values of all the differential bits in the created differential bitmap are "OFF".

Next, the copy management program 113 stops an I/O process (step 502). Specifically, the copy management program 113 inhibits the I/O control program 114 from performing the I/O process described below.

Next, the copy management program 113 changes the state of the pair to be created to the "initial copying and differential management executing" state (step 503). Specifically, the copy management program 113 registers the "initial copying and differential management executing" state in the pair information 116 as a state regarding the pair.

Next, the copy management program 113 restarts the I/O process (step 504). Specifically, the copy management program 113 permits the I/O control program 114 to perform the I/O process. Thereafter, when the host computer 150 issues a write request or a read request of data to the P-VOL, the I/O control program 114 executes the I/O process. At this time, the state of the pair is the "differential management executing" state (step 503). Therefore, when a write request of data is issued, a differential bit corresponding to the storage area in which the data is written becomes "ON" as described below.

Next, the copy management program 113 checks the first storage area in the virtual volume indicated by the area management information 115 as a target (step 505). Specifically, the copy management program 113 checks the first allocation bit in the allocation bitmap contained in the area management information 115 as a target.

Next, the copy management program 113 decides whether or not a real area is allocated to the checked storage area (step 506). Specifically, the copy management program 113 decides that a real area is allocated to the checked storage area when the checked allocation bit is "ON" and decides that a real area is not allocated to the checked storage area when the checked allocation bit is "OFF".

In the step 506, when it is decided that a real area is not allocated, the data in the checked storage area is not required to be copied to the S-VOL. In this case, the process proceeds to a step 508 without updating the differential bit.

On the other hand, when it is decided in the step 506 that a real area is allocated, the data in the checked storage area is required to be copied to the S-VOL. Therefore, the differential bit corresponding to the checked storage area is updated to "ON" (step 507).

The size of the storage area corresponding to one allocation bit sometimes differs from that of the storage area corresponding to one differential bit. When it is decided in the step 506 that the real area is allocated and at least a part of the storage area corresponding to one differential bit overlaps at least a part of the storage area corresponding to the checked allocation bit, the differential bit is updated to "ON" in the step 507.

Next, the copy management program 113 decides whether or not the check is terminated for all the storage areas in the virtual volume (step 508). Specifically, the copy management program 113 determines whether or not all the allocation bits have been checked.

When it is decided in the step 508 that all the storage areas have not been checked yet, it is necessary to check the remaining storage areas. Therefore, the copy management program 113 checks a next storage area as a new target. Specifically, the copy management program 113 checks an allocation bit subsequent to the currently checked allocation bit as a new check target in the allocation bitmap. Then, the process returns to the step 506.

On the other hand, when it is decided in the step 508 that the check is terminated for all the storage areas, the copy management program 113 terminates the differential bitmap creating process.

At the time when the differential bitmap creating process shown in FIG. 5 is terminated, a real area is allocated to the storage area corresponding to the differential bit "ON". On the other hand, a real area is not allocated to the storage area corresponding to the differential bit "OFF".

Figure 6:
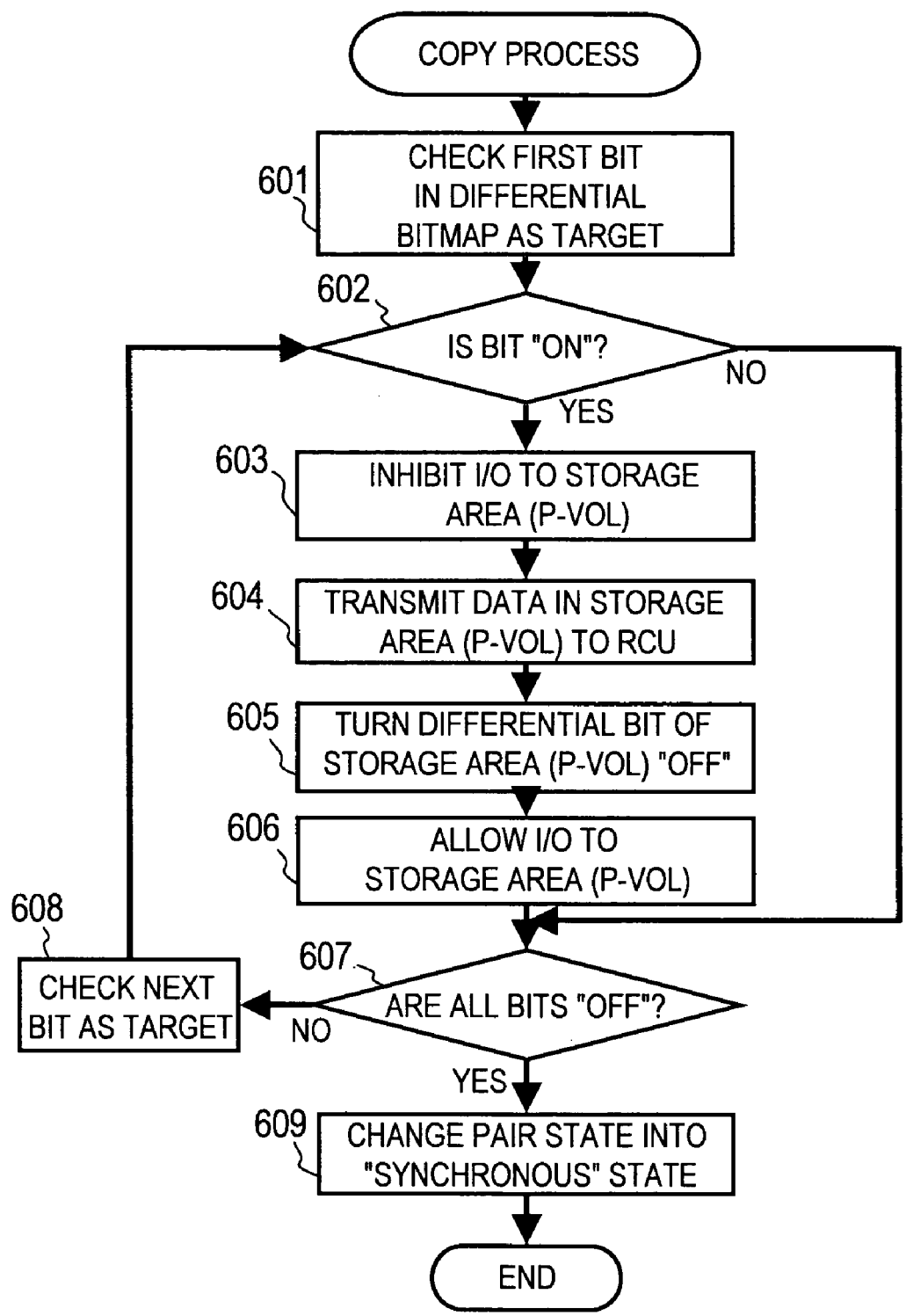
FIG. 6 is a flowchart showing the copy process executed by the copy management program on the MCU side according to this embodiment of this invention.

FIG. 6 is a flowchart showing the copy process executed by the copy management program 113 on the MCU side according to this embodiment of this invention.

The copy process in FIG. 6 is executed by the copy management program 113 of the storage system 100 on the MCU side in the step 402 in FIG. 4.

Upon start of the copy process, the copy management program 113 first checks the first differential bit in the differential bitmap as a target (step 601).

Next, the copy management program 113 decides whether or not the checked bit is "ON" (step 602). In the description of FIG. 6, the storage area in the P-VOL, which corresponds to the checked differential bit, is referred to as "the storage area (P-VOL)".

In the step 602, when it is decided that the checked differential bit is not "ON" (in other words, the checked differential bit is "OFF"), a real area is not allocated to the storage area (P-VOL) or the same data as that stored in the storage area in the S-VOL, which corresponds to the storage area (P-VOL), is stored in the storage area (P-VOL). In other words, it is not necessary to copy the data in the storage area (P-VOL) to the S-VOL. In this case, the process proceeds to a step 607.

On the other hand, when it is decided in the step 602 that the checked differential bit is "ON", a real area is allocated to the storage area (P-VOL). Furthermore, the storage area (P-VOL) stores data different from that stored in the storage area in the S-VOL, which corresponds to the storage area (P-VOL). In this case, it is necessary to copy the data in the storage area (P-VOL) to the S-VOL. In this case, the copy management program 113 inhibits the I/O control program 114 from performing the I/O process on the storage area (P-VOL) (step 603).

Next, the copy management program 113 transmits the data in the storage area (P-VOL) to the storage system 130 on the RCU side (step 604). As a result, the data in the storage area (P-VOL) is copied to the S-VOL. A process executed by the storage system 130 on the RCU side, which receives the data transmitted in the step 604, will be described below with reference to FIG. 7D.

In this embodiment, the transmission and reception of data between the MCU and the RCU as described above are executed through the interfaces 104 and the storage network 125.

Next, the copy management program 113 updates the differential bit corresponding to the storage area (P-VOL) (in other words, the checked differential bit) to "OFF" (step 605).

Next, the copy management program 113 allows the I/O control program 114 to perform the I/O program on the storage area (P-VOL) (step 606).

Next, the copy management program 113 decides whether or not all the differential bits in the differential bitmap are now "OFF" (step 607).

In the step 607, when it is decided that all the differential bits are not "OFF" (in other words, at least one differential bit is "ON"), the data stored in the S-VOL are not all the same as those stored in the P-VOL in some cases. In this case, the copy management program 113 checks a differential bit subsequent to the currently checked differential bit as a new target (step 608) and then returns to the step 602.

On the other hand, when it is decided in the step 607 that all the differential bits are "OFF", all the data stored in the S-VOL are the same as those stored in the P-VOL. In this case, the copy management program 113 changes the state of the pair to the "synchronous" state (step 609) to terminate the copy process.

Next, an example of the initial copy process will be described.

FIG. 7A is an explanatory view showing an example of the allocation bitmap when the initial copy process is executed in this embodiment of this invention.

In FIG. 7A, one block corresponds to one allocation bit in the allocation bitmap. For example, one block corresponds to one storage area in the virtual volume. Among the blocks, black blocks correspond to the allocation bits "ON" and the remaining blocks correspond to the allocation bits "OFF". Specifically, a real area is allocated to the storage area corresponding to the black block, while a real area is not allocated to the storage area corresponding to a white block.

FIG. 7B is an explanatory view showing an example of the differential bitmap created by the differential bitmap creating process according to this embodiment of this invention.

FIG. 7B shows a differential bitmap created based on the allocation bitmap shown in FIG. 7A as an example. Specifically, FIG. 7A and FIG. 7B respectively show the allocation bitmap and the differential bitmap for the same virtual volume.

In FIG. 7B, one block corresponds to one differential bit in the differential bitmap. In other words, one block corresponds to one storage area in the virtual volume. Among the blocks, a black block corresponds to the differential bit "ON", while a white block corresponds to the differential bit "OFF". In other words, data in the storage areas corresponding to the black blocks are required to be copied to the S-VOL, while data in the storage areas corresponding to the white blocks are not required to be copied to the S-VOL.

When the differential bitmap creating process is started, all the differential bits in the differential bitmap in FIG. 7B are "OFF" (step 501). Thereafter, it is decided for each differential bit whether or not a real area is allocated to the storage area corresponding to the differential bit (step 506). Specifically, it is decided whether or not the allocation bit corresponding to the differential bit is "ON". When it is decided that a real area is allocated, the differential bit is updated to "ON" (step 507).

As described with reference to FIG. 5, the size of the storage area corresponding to one allocation bit sometimes differs from that of the storage area corresponding to one differential bit. In the above-described example, the allocation bitmap shown in FIG. 7A is composed of forty-eight allocation bits, while the differential bitmap shown in FIG. 7B is composed of sixty differential bits. This shows the size of the storage area corresponding to one allocation bit differs from that of the storage area corresponding to one differential bit. In such a case, when a real area is allocated to at least a part of the storage area corresponding to one differential bit, the differential bit is updated to "ON" (steps 506 and 507).

As a result, the differential bit corresponding to the storage areas to which a real area is possibly allocated is updated to "ON". In other words, a real area is not allocated to the storage area corresponding to the differential bit having a value "OFF".

In this embodiment, when the differential bitmap shown in FIG. 7B is superposed on the allocation bitmap shown in FIG. 7A, the differential bit at least partially overlapping the allocation bit having a value "ON" is updated to "ON".

FIG. 7C is an explanatory view showing an example of the copy process in the initial copy process according to this embodiment of this invention.

FIG. 7C shows the copy process when the differential bitmap shown in FIG. 7B is created by the differential bitmap creating process as an example.

In this example, each of the P-VOL and the S-VOL is a virtual volume. In the P-VOL shown in FIG. 7C, a black area represents a storage area corresponding to a differential bit having a value "ON", while the remaining area represents a storage area corresponding to a differential bit having a value "OFF".

By the copy process, only data in the storage areas corresponding to the differential bits having a value "ON" is copied from the P-VOL to the S-VOL (the steps 602 and 604 in FIG. 6). Specifically, data in the storage areas in the P-VOL, which correspond to the differential bits having a value "ON", are transmitted from the MCU to the RCU. The RCU receiving the data allocates real areas of the RCU to the storage areas (an area indicated by a dotted line in FIG. 7C) in the S-VOL corresponding to the storage areas in the P-VOL that store the data. Then, the RCU stores the received data in the storage areas to which the real areas are allocated. A process of the RCU side at this time will be described in detail below as shown in FIG. 7D.

As a result, the real areas are allocated only to the storage areas in the S-VOL, which correspond to the storage areas in the P-VOL, to which the real areas are possibly allocated. As a result, the real areas on the S-VOL side can be efficiently used.

Figure 7D:
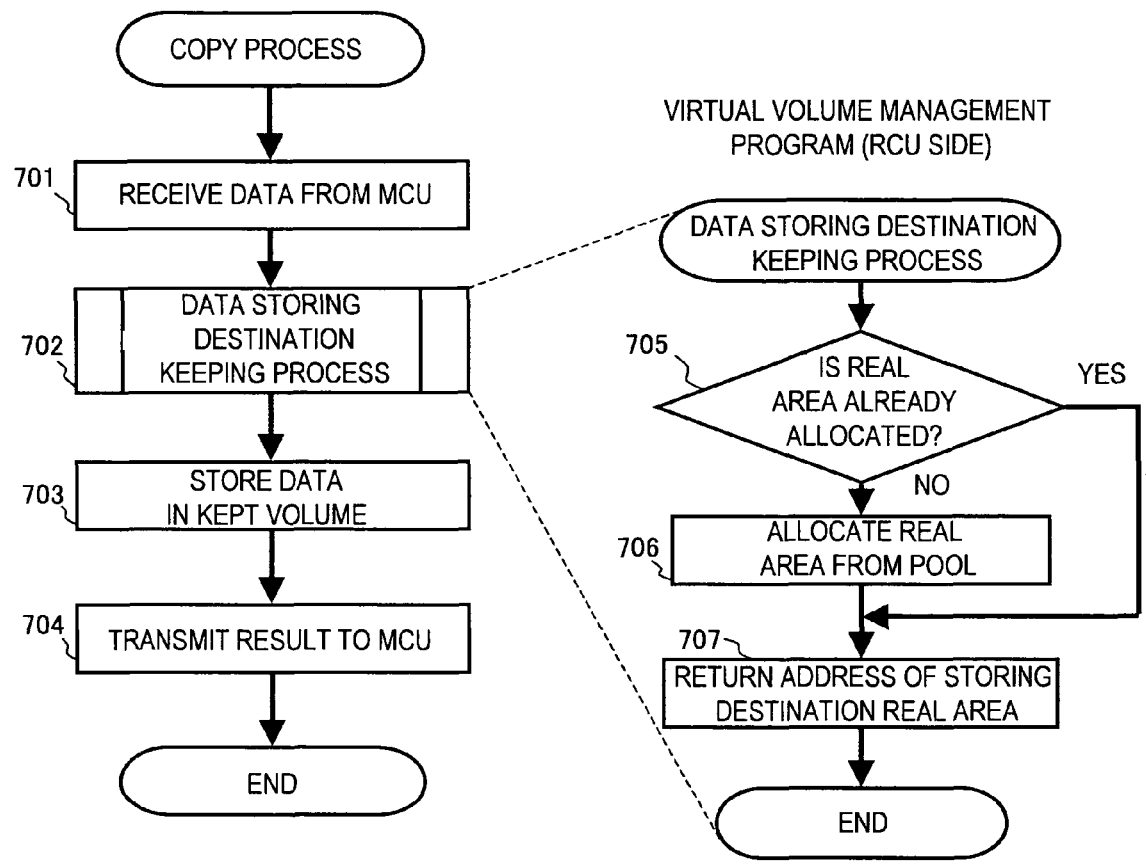
FIG. 7D is a flowchart showing the copy process executed by the copy management program on the RCU side according to this embodiment of this invention.

FIG. 7D is a flowchart showing the copy process and the like executed by the copy management program 113 on the RCU side according to this embodiment of this invention.

Upon reception of the data transmitted from the copy management program 113 on the MCU side in the step 604 in FIG. 6, the copy management program 113 of the storage system 130 on the RCU side executes the copy process in FIG. 7D.

Specifically, first, the copy management program 113 on the RCU side receives the data from the MCU (step 701).

Next, the copy management program 113 instructs the virtual volume management program 111 on the RCU side to execute a data storing destination keeping process (step 702). The process will be described below.

Next, the copy management program 113 stores the data received from the MCU in the area kept in the step 702 (step 703).

Next, the copy management program 113 transmits the result of the process to the MCU (step 704). Specifically, the copy management program 113 transmits information indicating whether or not data storage was successful.

By the above process, the copy process is terminated.

On the other hand, the virtual volume management program 111 on the RCU side, which receives the instruction in the step 702, executes the data storing destination keeping process.

First, the virtual volume management program 111 decides whether or not a real area is already allocated to the storage area in the S-VOL, in which the data received from the MCU is to be stored (step 705). Specifically, it is decided whether or not a real area is allocated to the storage area in the S-VOL (the area indicated by the dotted line in FIG. 7C), which corresponds to the storage area in the P-VOL, which stored the data.

In the step 705, when it is decided that a real area is not allocated to the storage area corresponding to the data storing destination, it is necessary to allocate a real area to the storage area. Therefore, the virtual volume management program 111 allocates a real area in the pool to the storage area (step 706). As a result, the real area is allocated only to the storage area corresponding to the data storing destination.

Next, the virtual volume management program 111 returns an address of the real area allocated to the storage area corresponding to the data storing destination to the MCU (step 707).

On the other hand, when it is decided in the step 705 that a real area is allocated to the storage area corresponding to the data storing destination, it is no longer necessary to allocate a real area to the storage area. Therefore, the virtual volume management program 111 returns the address of the real area allocated to the storage area corresponding to the data storing destination to the MCU (step 707).

By the above process, the data storing destination keeping process is terminated.

Figure 8:
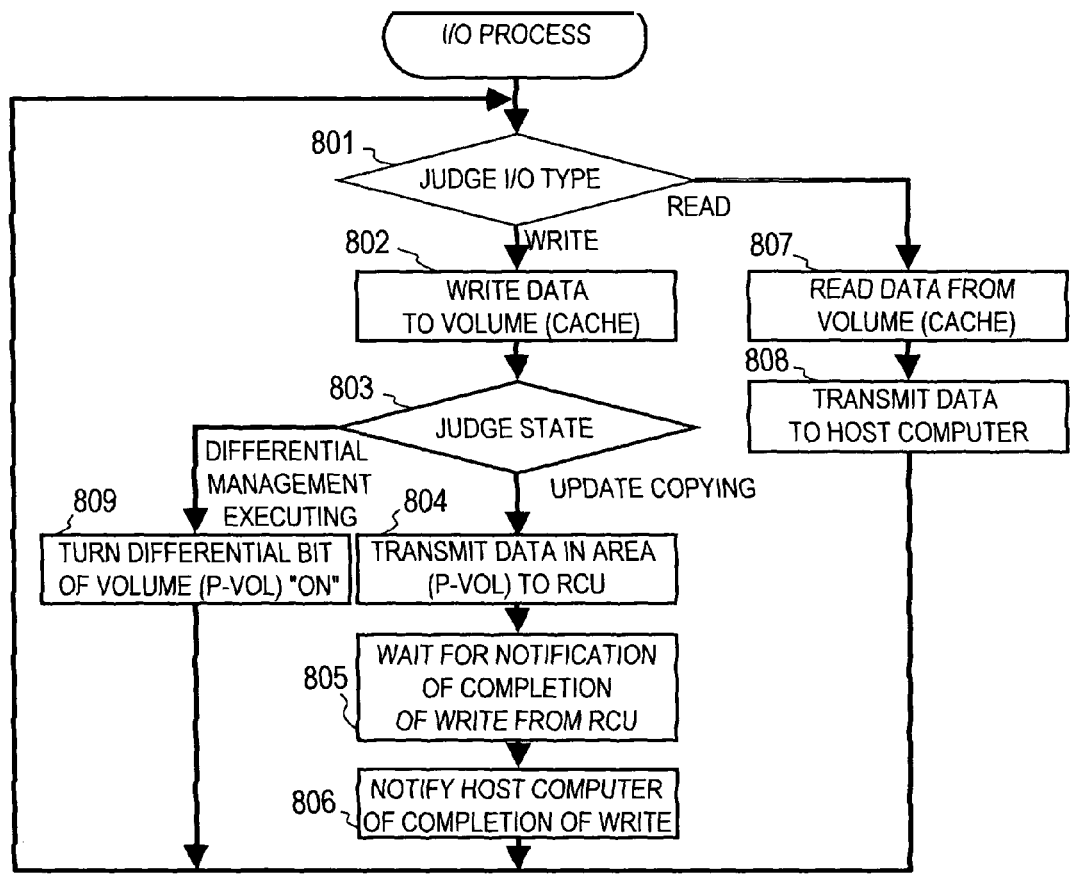
FIG. 8 is a flowchart showing the I/O process executed by the I/O control program according to this embodiment of this invention.

FIG. 8 is a flowchart showing the I/O process executed by the I/O control program 114 according to this embodiment of this invention.

The I/O process in FIG. 8 is executed by the I/O control program 114 when the storage system 100 receives an I/O request (in other words, a write request or a read request) from the host computer 150.

When the storage system 100 receives the I/O request to start the I/O process, the I/O control program 114 first decides the type of the I/O request (step 801).

In the step 801, when it is decided that the I/O request is a read request, the I/O control program 114 reads out target data from the logical volume to which the read request is addressed (step 807). At this time, instead of reading the data from the logical volume, the I/O control program 114 may read out the data from a cache (not shown).

In the description of FIG. 8, the logical volume may be a virtual volume.

Next, the I/O control program 114 transmits the read data to the host computer 150 (step 808). Then, in order to process a next I/O request, the process returns to the step 801.

On the other hand, when it is decided in the step 801 that the I/O request is a write request, the I/O control program 114 writes the target data in the logical volume to which the write request is addressed (step 802). At this time, instead of writing the data in the logical volume, the I/O control program 114 may write the data in the cache.

Next, the I/O control program decides the state of the pair to which the logical volume corresponding to a write target belongs (step 803).

In the step 803, when it is decided that the state of the pair is the "differential management executing" state, the state of the pair is "initial copying" or "suspend". In this case, the I/O control program 114 updates the differential bit corresponding to the storage area in which the data is to be written to "ON" (step 809). Then, the data written in the storage area is transmitted by the copy management program 113 to the RCU (the steps 602 and 604 in FIG. 6). As a result, the data written by the host computer 150 in the P-VOL corresponding to the write target is copied to the S-VOL.

Thereafter, in order to process a next I/O request, the process returns to the step 801.

On the other hand, when it is decided in the step 803 that the state of the pair is "update copying", the state of the pair is "synchronous". In this case, the I/O control program 114 transmits the data in the storage area corresponding to the data write target to the RCU (step 804). As a result, the data written in the P-VOL corresponding to the write target by the host computer 150 is copied to the S-VOL.

Next, the I/O control program 114 waits for a write completion notification from the RCU (step 805).

Upon reception of the write completion notification from the RCU, the I/O control program 114 notifies the host computer 150 of the completion of write (step 806).

Thereafter, in order to process a next I/O request, the process returns to the step 801.

Figure 9A:
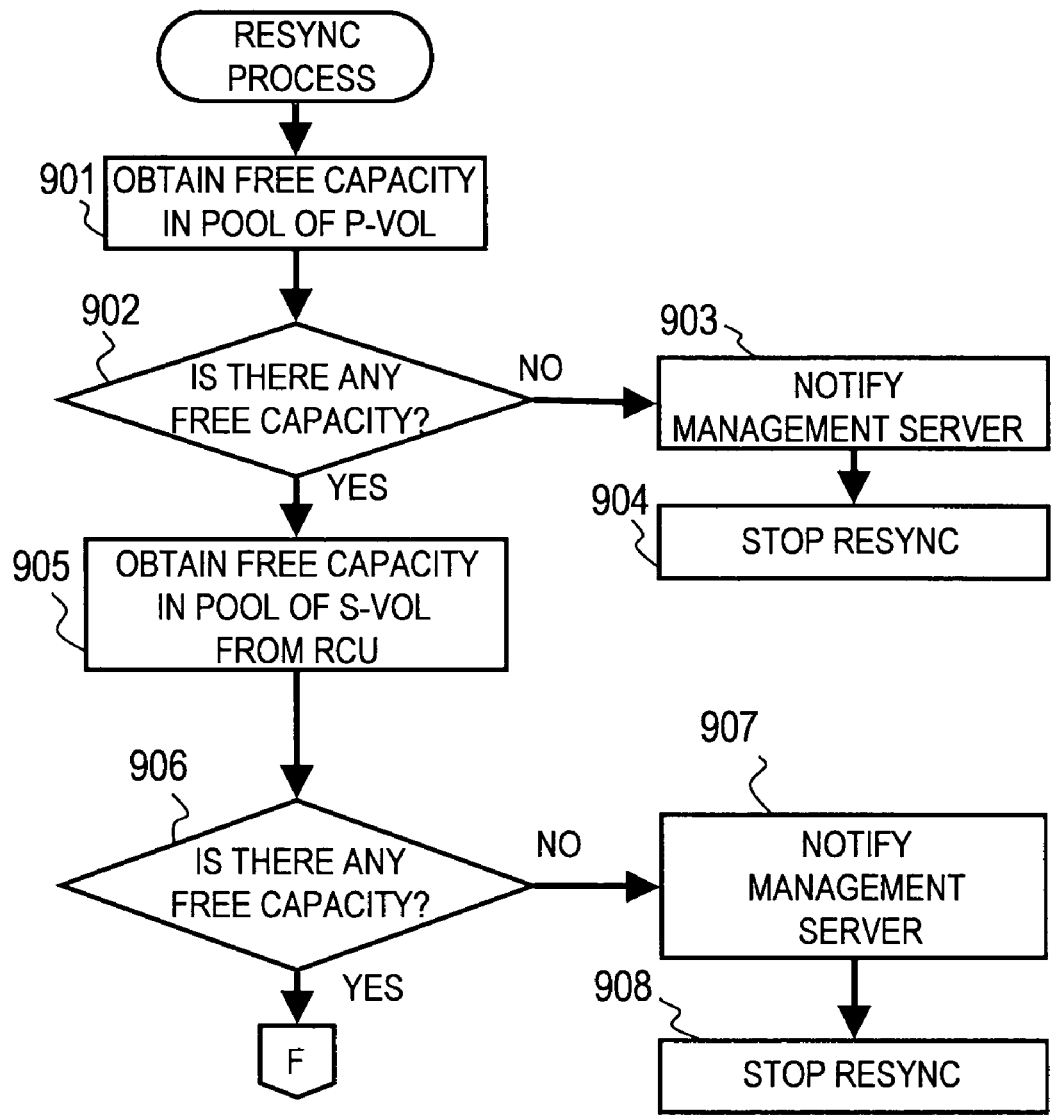
FIG. 9A is a flowchart showing the resync process executed by the copy management program according to this embodiment of this invention.
Figure 9B:
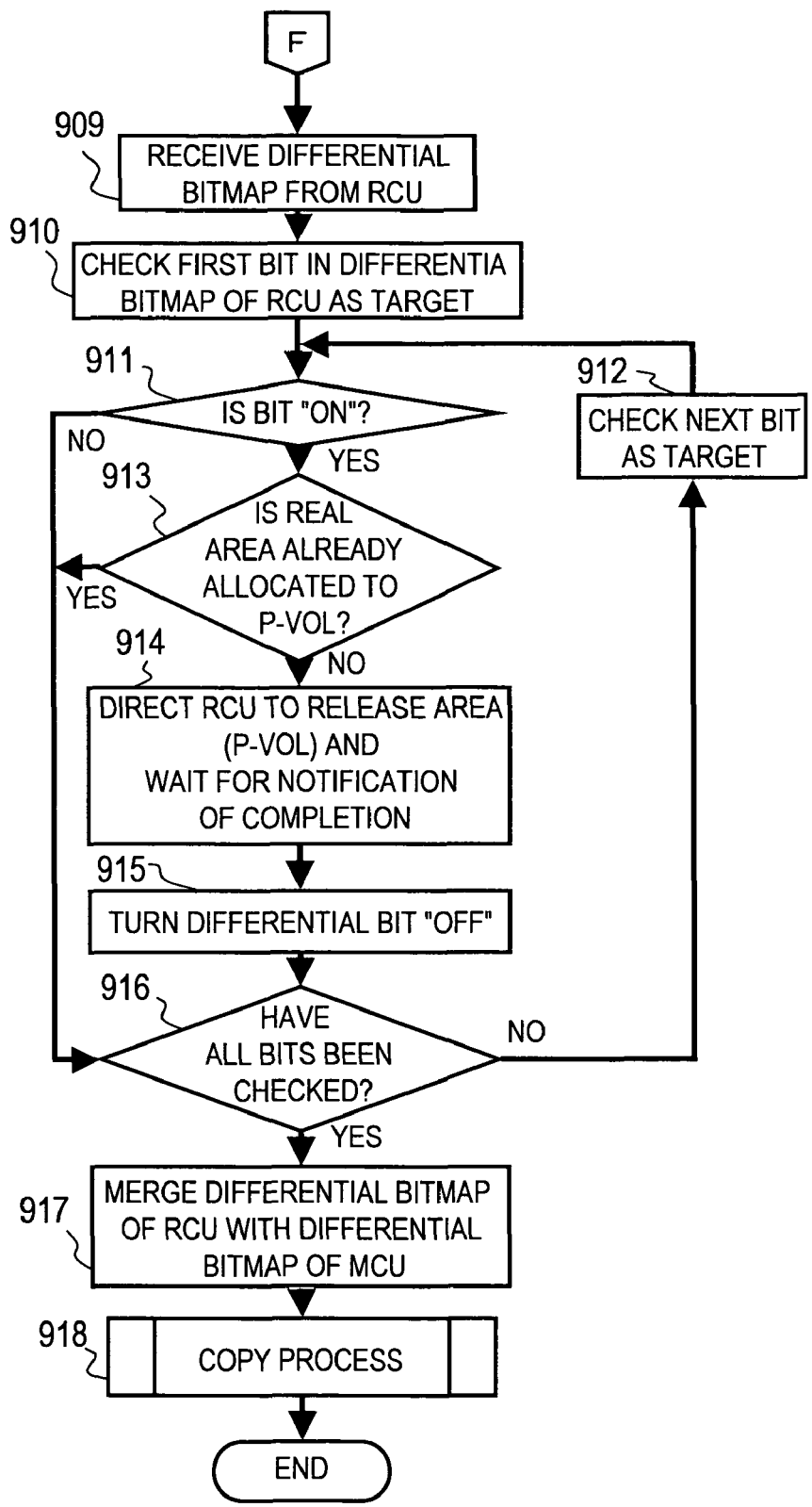
FIG. 9B is a flowchart showing the resync process executed by the copy management program according to this embodiment of this invention.

FIG. 9A and FIG. 9B are flowcharts of the resync process executed by the copy management program 113 according to this embodiment of this invention.

The resync process shown in FIG. 9A and FIG. 9B is executed by the copy management program 113 on the MCU side when the operation "resync" is executed for the remote copy pair in which the P-VOL is stored in the storage system 100 on the MCU side, while the S-VOL is stored in the storage system 130 on the RCU side.

First, the outline of the resync process will be described.

The copy management program 113 first refers to the free capacities in the pools of the P-VOL and the S-VOL so as to decide whether the resync is executable or not (step 901 to step 908).

When the resync is executable, the copy management program 113 releases a real area which is not any more needed by the execution of resync among the real areas allocated to the S-VOL (step 909 to step 916).

For example, when new data is written to an unused storage area in the S-VOL (in other words, the storage area to which a real area is not allocated) while the pair is being in the "suspend" state, a new real area is allocated to the storage area. Thereafter, when the resync is executed, the data written in the S-VOL during the "suspend" is overwritten by the data in the P-VOL. When a real area is not allocated to the storage area in the P-VOL, which corresponds to the storage area in the S-VOL to which the real area is allocated, the real area is no longer required to be allocated to the storage area in the S-VOL after the execution of the resync. The copy management program 113 deallocates the real area which is no longer necessary to be allocated to the storage area. As a result, the real area is released.

Next, the copy management program 113 executes the resync (steps 917 and 918).

Hereinafter, the resync process will be described in detail.

When the resync process is started, the copy management program 113 on the MCU side obtains information regarding the free capacity in the pool of the P-VOL (step 901). Specifically, the copy management program 113 refers to a counter (not shown) of the pool management information 117 in the MCU to calculate the free capacity in the pool of the P-VOL.

Next, in a step 902, the copy management program 113 decides whether or not the pool of the P-VOL has a free capacity (in other words, the calculated free capacity is not zero).

In the step 902, when it is decided that the pool of the P-VOL does not have any free capacity, new data cannot be written to the P-VOL. In this case, the copy management program 113 transmits a notification that the pool of the P-VOL does not have any free capacity to the management server 160 (step 903) so as to stop the resync process (step 904).

On the other hand, when it is decided in the step 902 that the pool of the P-VOL has a free capacity, new data can be written to the P-VOL. In this case, the copy management program 113 obtains information regarding the free capacity in the pool of the S-VOL from the RCU (step 905). The information regarding the free capacity in the pool of the S-VOL is calculated from a counter (not shown) of the pool management information 117 of the RCU.

Next, the copy management program 113 decides whether or not the pool of the S-VOL has a free capacity (step 906).

In the step 906, when it is decided that the pool of the S-VOL does not have any free capacity, new data cannot be written to the S-VOL. In this case, the copy management program 113 transmits a notification that the pool of the S-VOL does not have any free capacity to the management server 160 (step 907) so as to stop the resync process (step 908).

On the other hand, when it is decided in the step 906 that the pool of the S-VOL has a free capacity, new data can be written in any of the P-VOL and the S-VOL. In this case, the copy management program 113 can execute the resync. In such a case, the copy management program 113 receives the differential bitmap contained in the copy requirement information 118 of the RCU from the RCU (step 909).

Next, the copy management program 113 checks the first differential bit in the received differential bitmap of the RCU as a target (step 910).

Subsequently, the copy management program 113 decides whether or not the checked differential bit is "ON" (step 911).

In the step 911, when it is decided that the checked differential bit is not "ON", data is not written to the storage area corresponding to the differential bit during the "suspend". In this case, it is not necessary to release the real area allocated to the storage area. Therefore, in this case, the process proceeds to the step 916.

On the other hand, when it is decided in the step 911 that the checked differential bit is "ON", data is written to the storage area corresponding to the differential bit during the "suspend". In this case, it is then decided whether or not a real area is allocated to a storage area in the P-VOL, which corresponds to the storage area (step 913).

In the step 913, when it is decided that a real area is allocated to the storage area in the P-VOL, data in the real area of the P-VOL is copied to the real area allocated to the storage area of the S-VOL, which corresponds to the checked differential bit by the resync. Therefore, it is not necessary to release the real area allocated to the storage area in the S-VOL. In this case, the process proceeds to the step 916.

On the other hand, when it is decided in the step 913 that a real area is not allocated to the storage area in the P-VOL, the storage area in the S-VOL, which corresponds to the checked differential bit, is not used after the execution of the resync. Therefore, the copy management program 113 instructs the RCU to release the real area allocated to the storage area in the S-VOL, which corresponds to the checked differential bit and waits for a notification of the completion (step 914).

Upon reception of the notification of the completion from RCU, the copy management program 113 updates the checked differential bit to "OFF" (step 915).

Next, the copy management program 113 decides whether or not all the differential bits have been checked (step 916).

In the step 916, when it is decided that all the differential bits have not been checked yet, the remaining bits are required to be checked. Therefore, the copy management program 113 checks a differential bit subsequent to the currently checked differential bit as a new target (step 912) and then returns to the step 911.

On the other hand, when it is decided in the step 916 that all the differential bits have been checked, the copy management program 113 executes the resync. Specifically, the copy management program 113 merges the differential bitmap of the RCU with the differential bitmap of the MCU (step 917) and then executes the copy process shown in FIG. 6 (step 918).

The merging of the differential bitmaps executed in the step 917 will now be described. When a differential bit of the MCU is "ON", the differential bit is not updated. On the other hand, when a differential bit of the MCU is "OFF" while the corresponding differential bit of the RCU is "ON", the differential bit of the MCU is updated to "ON". For example, when a value "1" of the differential bit corresponds to "ON" and a value "0" corresponds to "OFF", a logical addition (OR) between the differential bit of the MCU and the corresponding differential bit of the RCU is performed. The copy management program 113 updates the result of the logical addition (OR) as a new value of the differential bit of the MCU.

When the copy process in the step 918 is terminated, the resync process is also terminated.

The restore process for copying data in the S-VOL on the RCU side to the P-VOL on the MCU side can also be executed in the same procedure as that of the resync described above.

Figure 10:
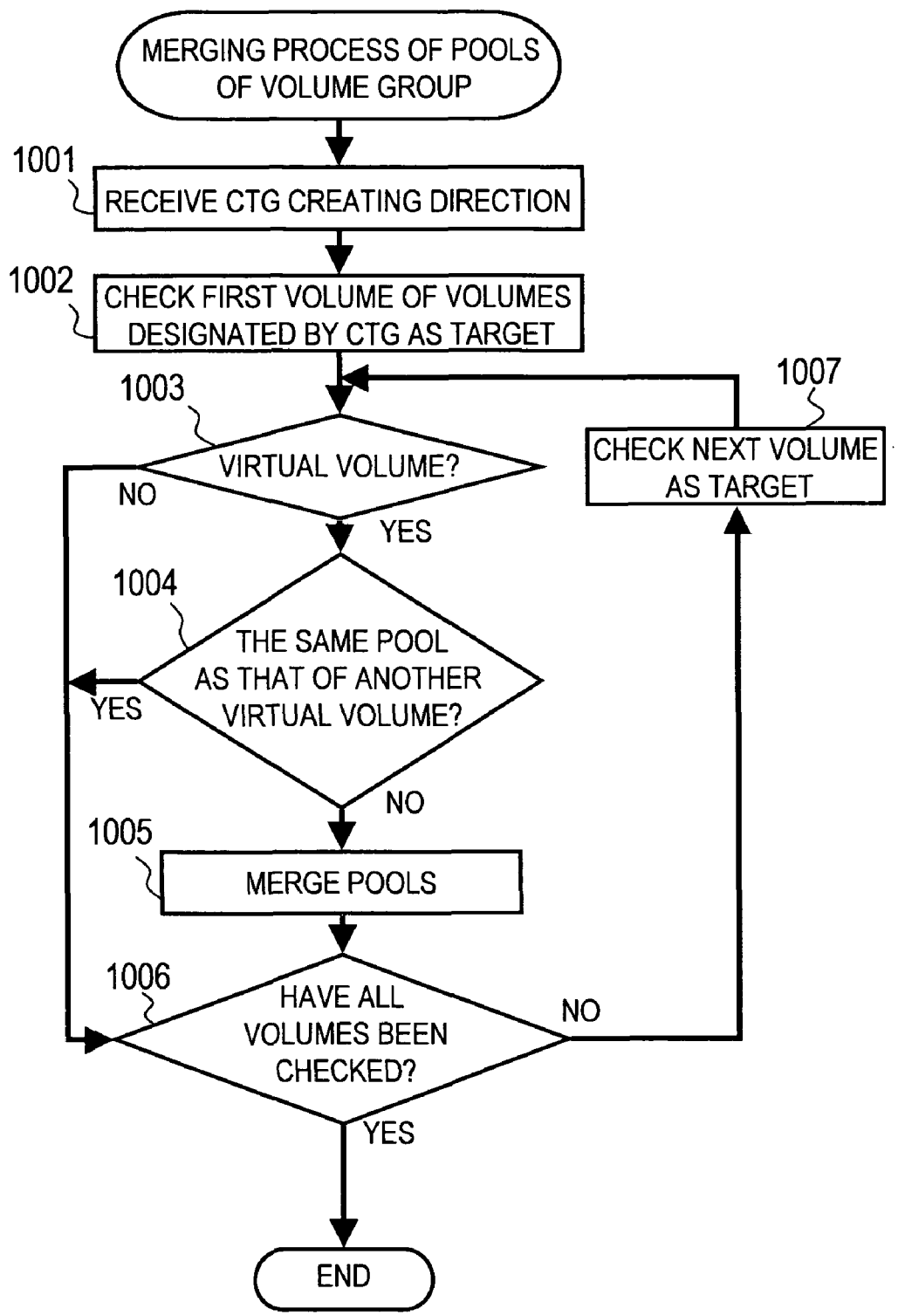
FIG. 10 is a flowchart showing the merging process of the pools in the volume group, which is executed by the copy management program according to this embodiment showing this invention.

FIG. 10 is a flowchart showing the merging process of the pools in the volume group, which is executed by the copy management program 113 according to this embodiment of this invention.

In the case where a plurality of virtual volumes are contained in one volume group and each of the virtual volumes corresponds to a different pool, when one of the pools does not have any free capacity, the entire volume group is brought into the "suspend" state. In order to prevent this phenomenon, the process shown in FIG. 10 merges the pools of the virtual volumes contained in the volume group into one. Although the following description is given for the case where the volume group is a consistency group (CTG), the process shown in FIG. 10 is also applicable to volume groups other than the CTG.

Upon reception of a CTG creating instruction from the management server 160 or the like, the copy management program 113 on the MCU side starts the merging process of the pools in the volume group (step 1001).

Next, the copy management program 113 checks the first logical volume of the plurality of logical volumes designated as the CTG as a check target (step 1002).

Next, the copy management program 113 decides whether or not the checked logical volume is a virtual volume (step 1003).

In the step 1003, when it is decided that the checked logical volume is not a virtual volume, the checked logical volume is not in correlation with the pool. In this case, since the copy management program 113 cannot merge the pools, the process proceeds to a step 1006.

On the other hand, when it is decided in the step 1003 that the checked logical volume is a virtual volume, the checked logical volume (the virtual volume) corresponds to the pool. In this case, the copy management program 113 decides whether the pool corresponding to the checked virtual volume is the same as the pool corresponding to another virtual volume (step 1004).

In the step 1004, when it is decided that the pool corresponding to the checked virtual volume is the same as the pool corresponding to another virtual volume, the pool is already merged. In this case, the process proceeds to a step 1006.

On the other hand, when it is decided in the step 1004 that the pool corresponding to the checked virtual volume is not the same as the pool corresponding to another virtual volume, the copy management program 113 merges the pool with the pool corresponding to another virtual volume (step 1005). Specifically, the copy management program 113 merges a list (not shown) of the real areas kept as the pool corresponding to the checked virtual volume with a list of the real areas kept as the pool corresponding to another virtual volume. Furthermore, the copy management program 113 sums up the values of a counter (not shown) indicating the amount of free capacities for the virtual volumes.

Next, the copy management program 113 decides whether or not all the logical volumes contained in the CTG have been checked (step 1006).

In the step 1006, when it is decided that all the logical volumes contained in the CTG have not been checked, it is necessary to check the remaining logical volumes. Therefore, the copy management program 113 sets a logical volume subsequent to the currently checked logical volume as a new check target (step 1007). Then, the process returns to the step 1003.

On the other hand, when it is decided in the step 1006 that all the logical volumes contained in the CTG have been checked, the merging process of the pools in the volume group ends.

Figure 11:
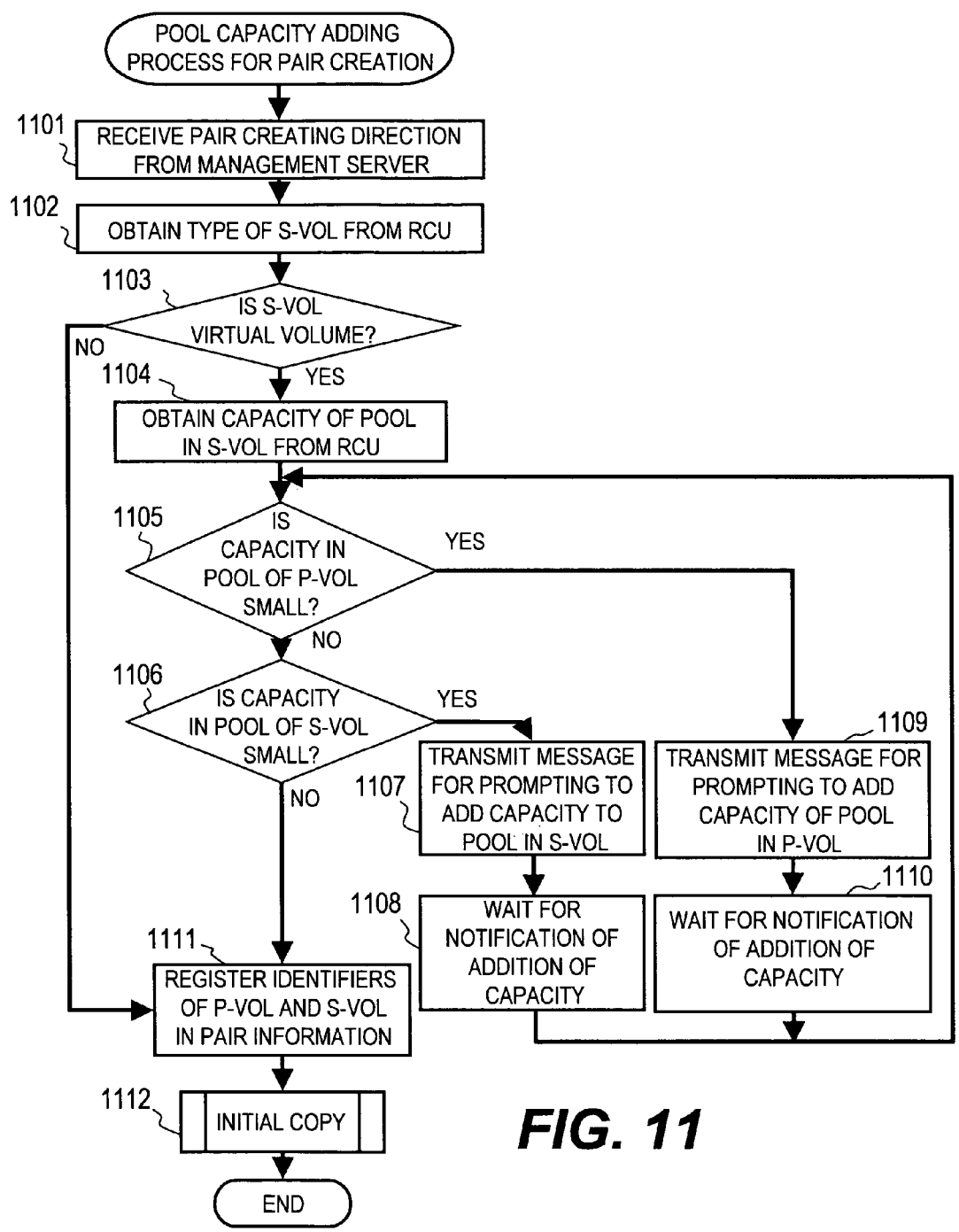
FIG. 11 is a flowchart showing the pool capacity adding process for pair creation, which is executed by the copy management program according to this embodiment of this invention.

FIG. 11 is a flowchart of the pool capacity adding process for pair creation, which is executed by the copy management program 113 according to this embodiment of this invention.

The system administrator can designate arbitrary two virtual volumes as, the P-VOL and the S-VOL, respectively, to create a pair. At this time, the capacities of the pools corresponding to the respective virtual volumes are not always the same. When the capacities of the pools differ from each other, the pair is brought into the "suspend" state at the time when there is no more free capacity in one of the pools even if the other pool still has a free capacity. In order to prevent this phenomenon, the copy management program 113 can execute the process shown in FIG. 11 prior to the execution of the pair creation. As a result, the capacity of the pool corresponding to the P-VOL becomes the same as that of the pool corresponding to the S-VOL.

Upon reception of a pair creation instruction from the management server 160, the copy management program 113 on the MCU side starts the pool capacity adding process for pair creation (step 1101).

Next, the copy management program 113 on the MCU side obtains information indicating the type of the S-VOL from the RCU (step 1102).

Next, the copy management program 113 refers to the information obtained from the RCU to decide whether or not the S-VOL is a virtual volume (step 1103).

In the step 1103, when it is decided that the S-VOL is not a virtual volume, the capacities of the pools are not required to be the same. In this case, the process proceeds to a step 1111.

On the other hand, when it is decided in the step 1103 that the S-VOL is a virtual volume, the capacities of the pools are required to be the same. Therefore, the copy management program 113 obtains information indicating the capacity of the pool in the S-VOL from the RCU (step 1104).

Next, the copy management program 113 refers to the information obtained from the RCU to decide whether or not the capacity of the pool in the P-VOL is smaller than that of the pool in the S-VOL (step 1105).

In the step 1105, when it is decided that the capacity of the pool in the P-VOL is smaller than that of the pool in the S-VOL, it is necessary to add a capacity to the pool in the P-VOL so that the capacities become the same. Therefore, the copy management program 113 transmits a message for prompting to add a capacity to the pool in the P-VOL to the management server 160 (step 1109).

Then, the copy management program 113 waits for a notification that the capacity is added to the pool in the P-VOL (step 1110). Upon reception of the notification, the copy management program 1113 returns to the step 1105 so as to confirm if the capacity of the pool in the P-VOL and that of the pool in the S-VOL are the same.

On the other hand, when it is decided in the step 1105 that the capacity of the pool in the P-VOL is not smaller than that of the pool in the S-VOL, the copy management program 113 then decides whether or not the capacity of the pool in the S-VOL is smaller than that of the pool in the P-VOL (step 1106).

In the step 1106, when it is decided that the capacity of the pool in the S-VOL is smaller than that of the pool in the P-VOL, it is necessary to add a capacity to the pool in the S-VOL so that the capacities become the same. Therefore, the copy management program 113 transmits a message for prompting to add a capacity to the pool in the S-VOL to the management server 160 (step 1107).

Then, the copy management program 113 waits for a notification that the capacity is added to the pool in the S-VOL (step 1108). Upon reception of the notification, the copy management program 113 returns to the step 1105 so as to confirm if the capacity of the pool in the P-VOL and that of the pool in the S-VOL are the same.

On the other hand, when it is decided in the step 1106 that the capacity of the pool in the S-VOL is not smaller than that of the pool in the P-VOL, the capacity of the pool in the P-VOL is the same as that of the pool in the S-VOL. In this case, the copy management program 113 registers identifiers of the P-VOL and the S-VOL in the pair information 116 (step 1111).

Next, the copy management program 113 executes the initial copy process shown in FIG. 4 (step 1112).

By the above process, the pool capacity adding process for pair creation is terminated.

Next, a process of adding a capacity to the pool during the operation of the computer system will be described. The following description is given on the premise that the pool capacity adding process for pair creation shown in FIG. 11 is already executed so that the capacities of the pools in the P-VOL and the S-VOL are the same.

For example, in the step 311 shown in FIG. 3B, the step 323 shown in FIG. 3C, the step 331 shown in FIG. 3D, the step 342 shown in FIG. 3E, or the step 903 or 907 shown in FIG. 9A, the management server 160 is notified that the pool runs out of the capacity or there is no free capacity in the pool. In such a case, the system administrator can operate the management server 160 through the management terminal 170 to add a capacity to the pool in the virtual volume. When the virtual volume is included in the remote copy pair, it is necessary to add the same capacity to the pool in the P-VOL and the pool in the S-VOL.

Figure 12A:
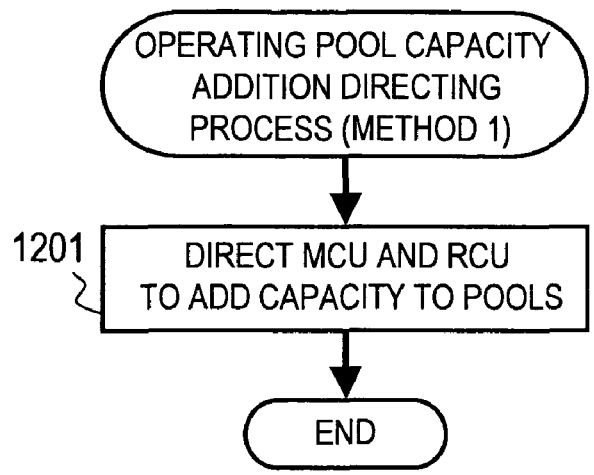
FIG. 12A is a flowchart showing an operating pool capacity addition instructing process (method 1) executed by the management tool according to this embodiment of this invention.
Figure 12B:
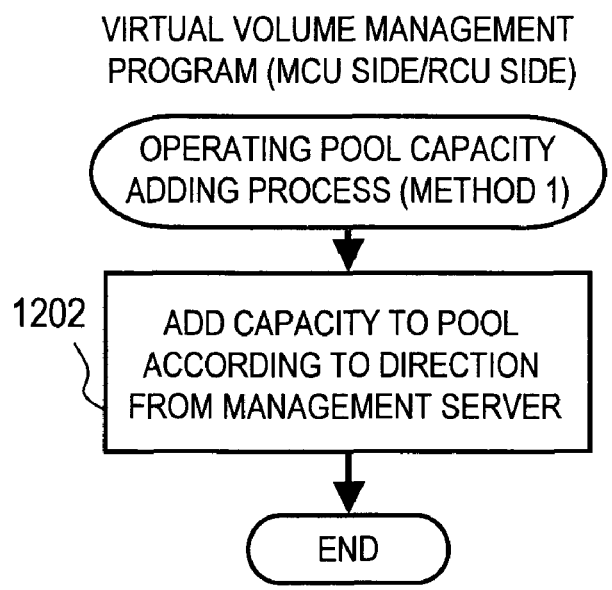
FIG. 12B is a flowchart showing the operating pool capacity adding process (method 1) executed by the virtual volume management programs of the MCU and the RCU according to this embodiment of this invention.
Figure 13A:
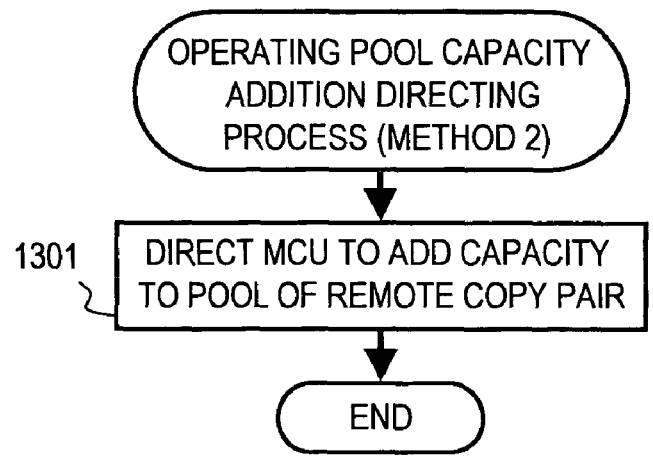
FIG. 13A is a flowchart showing the operating pool capacity addition instructing process (method 2) executed by the management tool according to this embodiment of this invention.
Figure 13B:
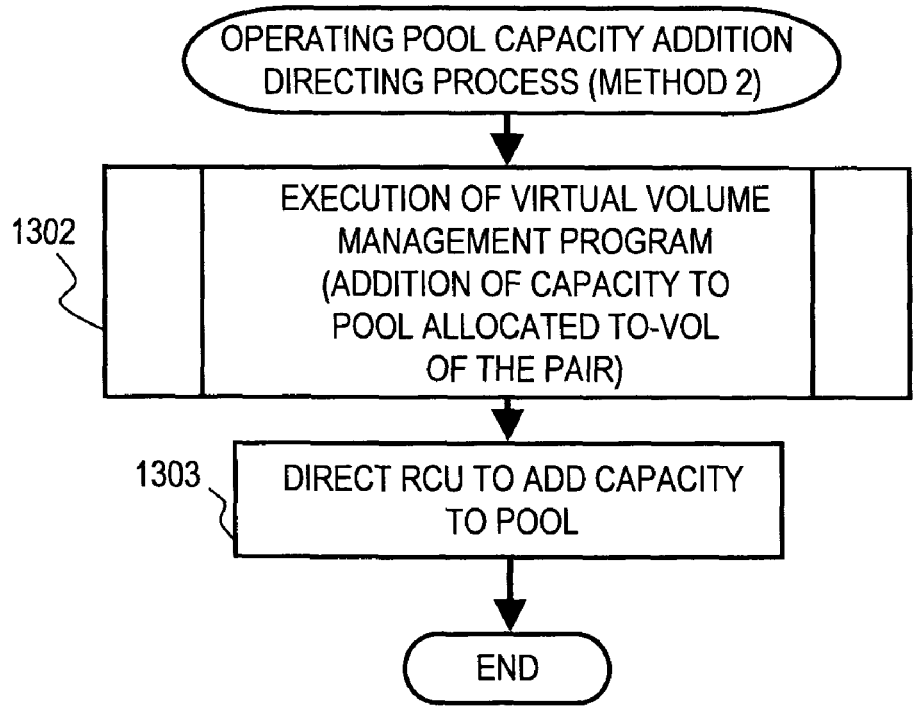
FIG. 13B is a flowchart showing the operating pool capacity adding process (method 2) executed by the copy management program of the MCU according to this embodiment of this invention.
Figure 13C:
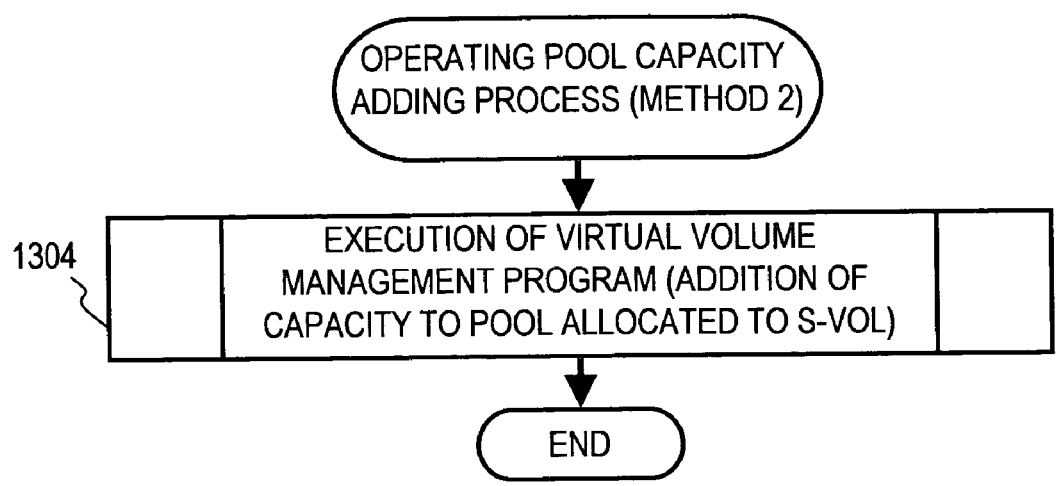
FIG. 13C is a flowchart showing the operating pool capacity adding process (method 2) executed by the copy management program on the RUM side according to this embodiment of this invention.

As described in FIG. 1, the management server 160 and the storage system 100 are always connected to each other through the management network 165. However, the management server 160 and the storage system 130 are not sometimes connected to each other. In the following description, the "method 1" refers to a process of adding a capacity to the pool when the management server 160 and the storage system 130 are connected to each other through the management network 165, as shown in FIG. 12A and FIG. 12B. On the other hand, the "method 2" refers to a process of adding a capacity to the pool when the management server 160 and the storage system 130 are not connected to each other through the management network 165, as shown in FIGS. 13A to 13C. The above processes are executed by the management tool 163 of the management server 160.

FIG. 12A is a flowchart showing an operating pool capacity addition instructing process (method 1) executed by the management tool 163 according to this embodiment of this invention.

For example, the system administrator designates the P-VOL and the S-VOL corresponding to pool capacity addition targets and a capacity to be added so as to input a pool capacity adding instruction to the management terminal 170.

In response to the input instruction, the management tool 163 instructs the MCU and the RCU to add the capacity to the pool (step 1201). In this manner, the process is terminated.

FIG. 12B is a flowchart showing the operating pool capacity adding process (method 1) executed by the virtual volume management programs 111 of the MCU and the RCU according to this embodiment of this invention.

In response to a instruction of adding a capacity to the pool from the management tool 163 of the management server 160, the virtual volume management program 111 of the MCU and the RCU adds a capacity to the pool according to the instruction (step 1202). Specifically, the virtual volume management program 111 adds information regarding a real area to be newly added to a list indicating real areas kept as pools in the pool management information 117 for the target pool. Furthermore, the virtual volume management program 111 adds the amount of the real area to be newly added to the counter indicating the amount of the free area. As described above, the process is terminated.

FIG. 13A is a flowchart showing the operating pool capacity addition instructing process (method 2) executed by the management tool 163 according to this embodiment of this invention.

As in the case shown in FIG. 12A, the system administrator inputs a instruction to the management terminal 170.

According to the input instruction, the management tool 163 instructs the MCU to add a capacity to the pool for the remote copy pair (step 1301). By the above process, the process is terminated.

FIG. 13B is a flowchart showing the operating pool capacity adding process (method 2) executed by the copy management program 113 of the MCU according to this embodiment of this invention.

Upon reception of a instruction of adding a capacity to the pool from the management tool 163 of the management server 160, the copy management program 113 on the MCU side executes the virtual volume management program 111 (step 1302). The virtual volume management program 111 on the MCU side adds a capacity to the pool in the P-VOL according to the instruction. The specific process executed by the virtual volume management program 111 at this time is the same as that in the step 1202 shown in FIG. 12B.

Next, the copy management program 113 on the MCU side instructs the RCU to add a capacity to the pool (step 1303). The instruction is transmitted from the I/F 104 of the MCU (in other words, the storage system 100) through the storage network 125 to the RCU (in other words, the storage system 130).

By the above process, the process is terminated.

FIG. 13C is a flowchart showing the operating pool capacity adding process (method 2) executed by the copy management program 113 on the RCU side according to this embodiment of this invention.

Upon reception of a instruction of adding a capacity to the pool from the MCU, the copy management program 113 on the RCU side executes the virtual volume management program 111 (step 1304). The virtual volume management program 111 on the MCU side adds a capacity to the pool in the S-VOL according to the instruction. The specific process executed by the virtual volume management program 111 at this time is the same as that in the step 1202 shown In FIG. 12B.

By the above process, the process is terminated.

Figure 14:
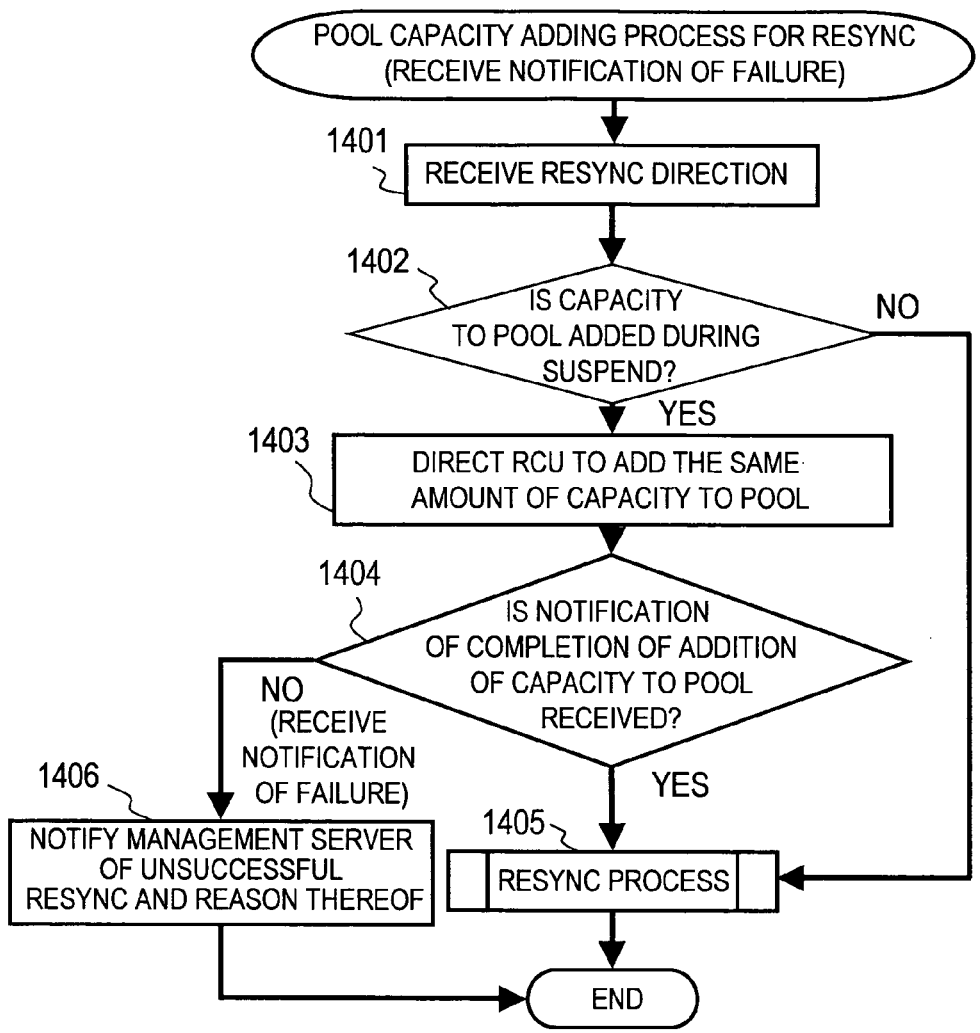
FIG. 14 is a flowchart showing the pool capacity adding process for resync, which is executed by the copy management program according to this embodiment of this invention.

FIG. 14 is a flowchart showing the pool capacity adding process for resync, which is executed by the copy management program 113 according to this embodiment of this invention.

The pool capacity adding process for resync shown in FIG. 14 is executed by the copy management program 113 on the MCU side so that the capacity of the pool in the S-VOL becomes the same as that of the P-VOL when a capacity is added to the pool in the P-VOL while the pair is in the "suspend" state and then the resync is executed.

Upon reception of a resync instruction from the management server 160, the copy management program 113 on the MCU side starts the pool capacity adding process for resync (step 1401).

Next, the copy management program 113 decides whether or not a capacity has been added to the pool in the P-VOL while the pair is in the "suspend" state (step 1402). For example, the copy management program 113 may refer to the pool management information 117 on the MCU side and the pool management information 117 on the RCU side so as to decide whether or not the capacity of the pool in the P-VOL is the same as that of the pool in the S-VOL.

In the step 1402, when it is decided that a capacity has not been added to the pool, it is not necessary to add a capacity to the pool because the capacity of the pool in the P-VOL is the same as that of the pool in the S-VOL. In this case, the process proceeds to a step 1405.

On the other hand, when it is decided in the step 1402 that a capacity has been added to the pool, the capacity of the pool in the P-VOL is larger than that of the pool in the S-VOL. In this case, it is necessary to add a capacity to the pool in the S-VOL. Therefore, the copy management program 113 instructs the RCU to add the same amount of capacity as that added to the pool in the P-VOL to the pool in the S-VOL (step 1403). This instruction is transmitted from the I/F 104 of the MCU (in other words, the storage system 100) through the storage network 125 to the RCU (in other words, the storage system 130).

Next, the copy management program 113 decides whether or not the copy management program 113 has received a notification that the addition of a capacity to the pool is completed from the RCU (step 1404).

In the step 1404, when it is decided that the copy management program 113 receives the notification that the addition of a capacity to the pool is completed from the RCU, the capacity of the pool in the P-VOL is the same as that of the pool in the S-VOL at this time. Therefore, the copy management program 113 executes the resync process shown in FIG. 9 (step 1405).

On the other hand, when it is decided in the step 1404 that the copy management program 113 has received a notification that the addition of a capacity to the pool failed from the RCU, the capacity of the pool in the P-VOL is not the same as that of the pool in the S-VOL at this time. In this case, the copy management program 113 notifies the management server 160 of the unsuccessful resync and the reason thereof without executing the resync process (step 1406). The reason of the unsuccessful resync is that the addition of a capacity to the pool in the S-VOL failed.

By the above process, the pool capacity adding process for resync is terminated.

When the restore (reverse resync) is executed, the copy management program 113 on the RCU side executes the same pool capacity adding process as that shown in FIG. 14. In this case, the RCU receives the resync instruction (step 1401) to decide whether or not a capacity has been added to the pool in the S-VOL (step 1402). Then, the copy management program 113 on the RCU side instructs the MCU to add a capacity to the pool (step 1403) to receive a notification that the capacity has been added to the pool from the RCU (step 1404). Then, the copy management program 113 on the RCU side executes the restore process (step 1405).

The above-described embodiment has been described for the case where the P-VOL and the S-VOL forms a remote copy pair. Next, this embodiment will be described for the case where the P-VOL and the S-VOL forms a local copy pair (in other words, the P-VOL and the S-VOL are both stored in the storage system 100 on the MCU side).

Figure 15:
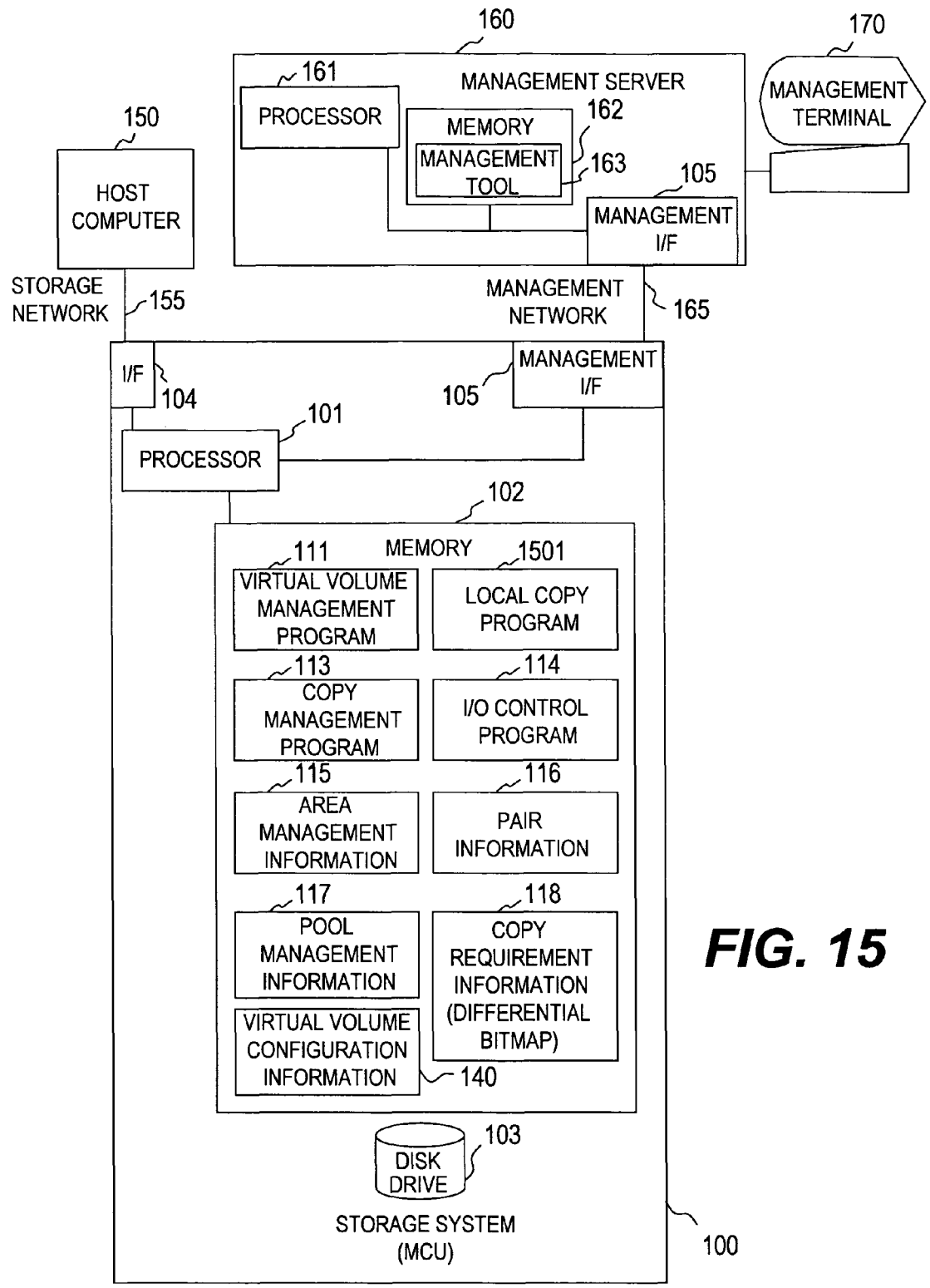
FIG. 15 is a block diagram showing a configuration of the computer system when a local copy pair is created in this embodiment of this invention.

FIG. 15 is a block diagram showing a configuration of the computer system when a local copy pair is created in this embodiment of this invention.

Hereinafter, only the parts different from those of FIG. 1 will be described with reference to FIG. 15.

In contrast to FIG. 1, since a local copy pair is created in the storage system 100 in FIG. 15, the storage system 130 on the RCU side is not required. Moreover, in the storage system 100 and the management server 160, the I/Fs 104 and the management I/F 105 for communication with the storage system 130 are not required.

The memory 102 of the storage system 100 shown in FIG. 15 further stores virtual volume configuration information 140 and a local copy program 1501 for executing the local copy in the storage system 100.

As described above, this embodiment can be applied even to the case where the local copy pair is created.

However, when the P-VOL and the S-VOL are stored in the same storage system 100, the pool corresponding to the P-VOL is the same as that corresponding to the S-VOL in some cases. In this case, there is a possibility that a real area corresponding to the P-VOL and that corresponding to the S-VOL are contained in the same parity group.

The parity group is a data aggregate sharing the same parity. For example, when a failure occurs in the disk drive 103 to result in data loss in one of the disk drives 103 contained in one parity group, data in the remaining disk drives 103 contained in the parity group can be used to restore the lost data.

The lost data cannot be restored in some cases because a large amount of data is lost in the parity group. However, as long as data is duplicated (made redundant), even when one of the data obtained by the duplication (for example, the data in the P-VOL) is lost, the other data (for example, the data in the S-VOL) can be used. In this manner, fault tolerance of the computer system can be improved by the duplication of data.

However, in the case where the real area corresponding to the P-VOL and the real area corresponding to the S-VOL are contained in the same parity group, the data in the P-VOL and the data in the S-VOL are simultaneously lost when the data in the parity group is lost. In this case, although the data is duplicated, the fault tolerance is not improved. Therefore, in order to improve the fault tolerance, the real area corresponding to the P-VOL and the real area corresponding to the S-VOL are required to be contained in different parity groups in the local copy pair.

In this embodiment, the management server 160 prevents a virtual volume corresponding to the same pool in the P-VOL in the local copy pair from being selected as the S-VOL. Alternatively, the copy management program 113 can prevent a pair from being created between the P-VOL and the S-VOL corresponding to the same pool. Hereinafter, processes necessary for the management server 160 or the copy management program 113 to create a local copy pair and the like will be described.

FIG. 18 is an explanatory view showing the virtual volume configuration information 140 according to this embodiment of this invention.

The virtual volume configuration information 140 is composed of a virtual volume ID 141, a pool ID 142, and a parity group ID 143.

The virtual volume ID 141 is an identifier for uniquely designating a virtual volume that the storage system 100 can provide for the host computer 150. The virtual volume may correspond to the P-VOL or the S-VOL forming a local copy pair.

The pool ID 142 is an identifier for designating a pool obtained by grouping the real areas kept for the respective virtual volumes.

The parity group ID 143 is an identifier for designating a parity group contained in the pool.

Figure 16:
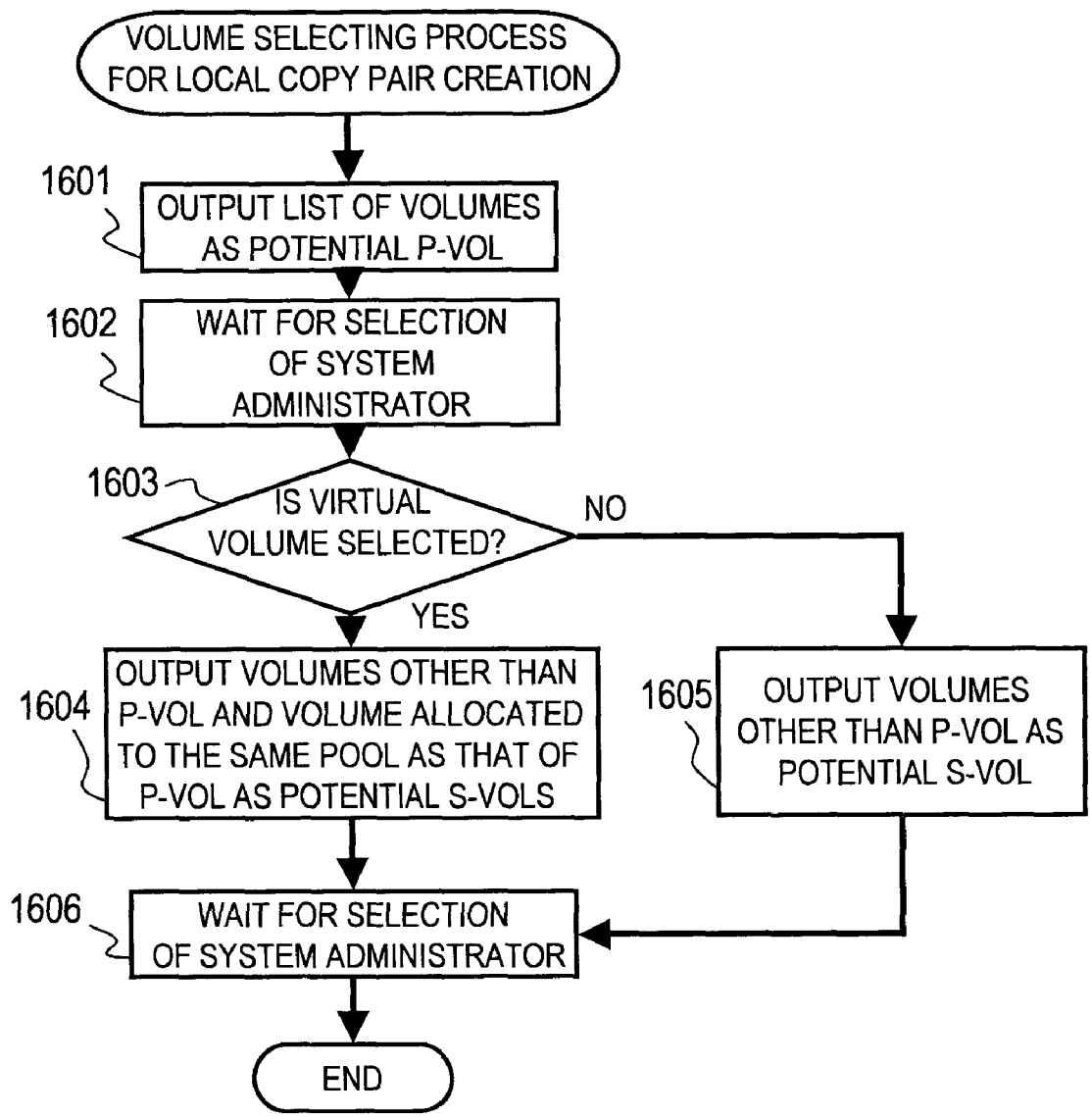
FIG. 16 is a flowchart showing a volume selecting process for local copy pair creation, executed by the management tool 162 according to this embodiment of this invention.

FIG. 16 is a flowchart showing a volume selecting process for local copy pair creation, executed by the management tool 163 according to this embodiment of this invention.

The management tool 163 is a program stored in the memory 162 of the management server 160 to be executed by the processor 161. In other words, in the following description, the process executed by the management tool 163 is executed, in practice, by the processor 161 operating the management tool 163.

When the volume selecting process for local copy pair creation is started, the management tool 163 first outputs a list of the logical volumes stored in the storage system 100 as a potential P-VOL of a pair to be created (step 1601). As the output process, the list may be displayed on a display screen (not shown) of the management terminal 170.

Next, the management tool 163 waits for the selection of the system administrator (step 1602). The system administrator refers to the list of the logical volumes presented in the step 1601 to select a P-VOL of a pair to be created so as to input identification information of the selected P-VOL to the management terminal 170.

When the P-VOL is selected by the system administrator, the management tool 163 decides whether or not the selected P-VOL is a virtual volume (step 1603).

In the step 1603, when it is decided that the virtual volume has been selected as the P-VOL, it is necessary to prevent the logical volume corresponding to the same pool as that of the P-VOL from being selected as the S-VOL. Therefore, the management tool 163 obtains the virtual volume configuration information 140 from the storage system 100 through the management I/F 105. Next, the management tool 163 refers to the virtual volume configuration information 140 and the pair information to extract a virtual volume that is not allocated yet. Then, the management tool 163 refers to the pool IDs in the virtual volume configuration information 140, which correspond to the P-VOL and the extracted virtual volume to designate a virtual volume other than the P-VOL and the virtual volume allocated to the same pool as that of the P-VOL so as to output the designated virtual volume as a potential S-VOL (step 1604). In other words, the selected P-VOL is eliminated from the logical volumes stored in the storage system 100 and then the virtual volume allocated to the same pool as that of the P-VOL is eliminated. The remaining logical volumes are output as potential S-VOLs. These potential S-VOLs may be displayed on the display screen of the management terminal 170 as in the step 1601.

On the other hand, when it is decided in the step 1603 that the logical volume that is not a virtual volume has been selected as the P-VOL, the P-VOL does not correspond to any of the pools. Therefore, any of the logical volumes other than the P-VOL can be selected as the S-VOL. Therefore, the management tool 163 outputs logical volumes other than the P-VOL as potential S-VOLs (step 1605).

After executing the step 1604 or 1605, the management tool 163 waits for the selection of the system administrator (step 1606). Then, when the system administrator selects the S-VOL, the P-VOL and the S-VOL of the local copy pair to be created are determined.

By the above process, the volume selecting process for local copy pair creation is terminated. Although the volumes other than the virtual volume allocated to the same pool are extracted in the step 1604, the parity group ID 143 may be referred to so as to extract the volumes other than the virtual volume allocated to the same parity group.

Figure 17:
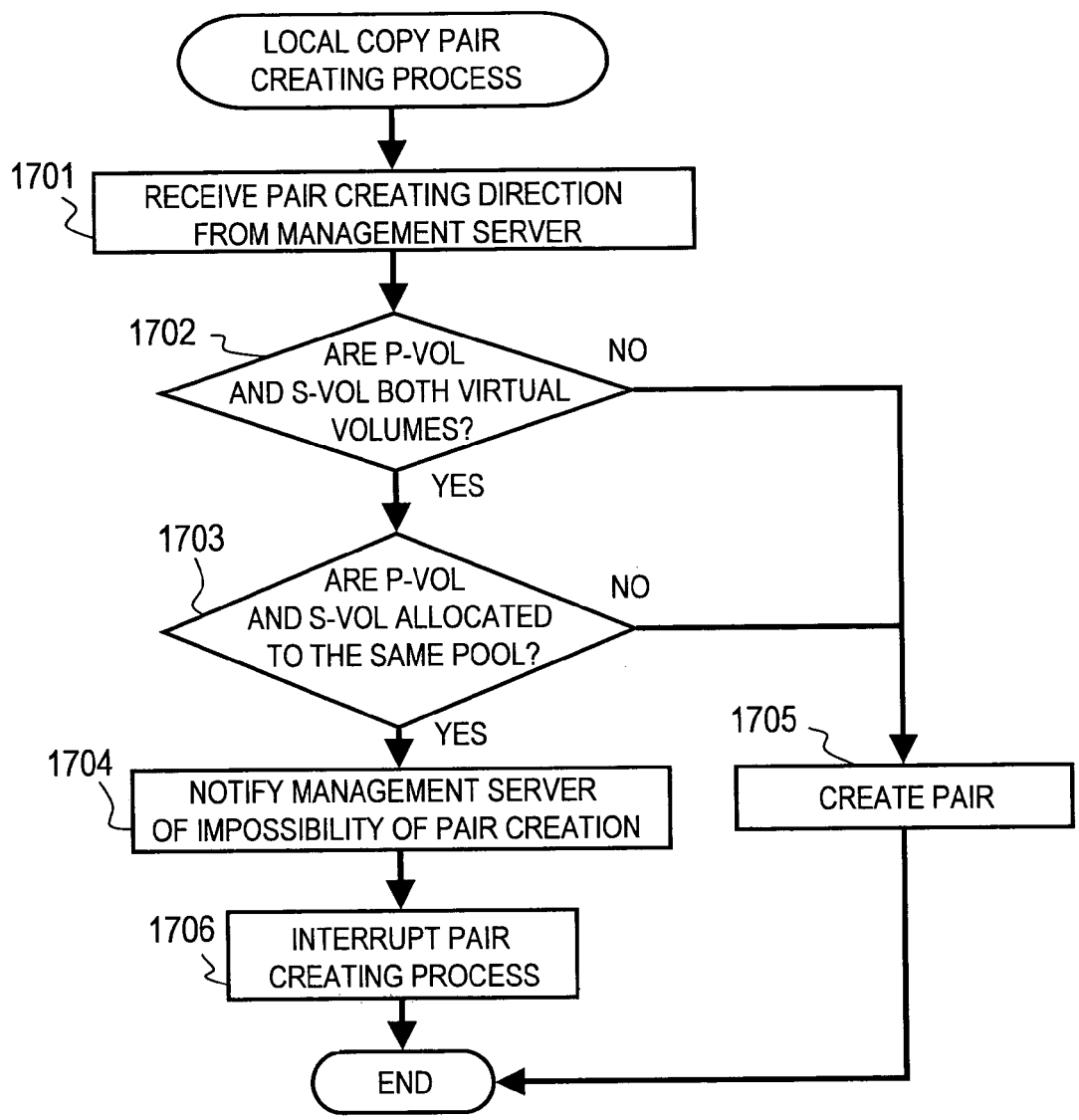
FIG. 17 is a flowchart showing the local copy pair creating process executed by the copy management program according to this embodiment of this invention.

FIG. 17 is a flowchart showing the local copy pair creating process executed by the copy management program 113 according to this embodiment of this invention.

When the local copy pair creating process is started, the copy management program 113 first receives a local copy pair creating instruction from the management server 160 (step 1701). At this time, the management tool 163 is not required to be executing the process shown in FIG. 16.

Next, the copy management program 113 decides whether or not the P-VOL and the S-VOL of the pair designated by the pair creating instruction are both virtual volumes (step 1702).

In the step 1702, when it is decided that both the P-VOL and the S-VOL are virtual volumes, the copy management program 113 decides whether or not the P-VOL and the S-VOL are allocated to the same pool (step 1703).

In the step 1703, when the virtual volume configuration information 140 is referred to so as to refer to the pool IDs 142 associated with the virtual volume IDs 141 corresponding to the P-VOL and the S-VOL to decide that the P-VOL and the S-VOL are allocated to the same pool, fault tolerance is not improved even if the pair is created between the P-VOL and the S-VOL. Therefore, the copy management program 113 notifies the management server 160 of the impossibility of pair creation (step 1704) to interrupt the pair creating process (step 1706).

On the other hand, when it is decided in the step 1702 that at least one of the P-VOL and the S-VOL is not a virtual volume, fault tolerance is expected to be improved by creating the pair between the P-VOL and the S-VOL. Fault tolerance is also expected to be improved even when it is decided in the step 1703 that the P-VOL and the S-VOL are not allocated to the same pool. Therefore, in the cases described above, the copy management program 113 creates a pair between the P-VOL and the S-VOL (step 1705).

By the above process, the local copy pair creating process is terminated. As described above, when the management tool 163 executes the process shown in FIG. 16 or the copy management program 113 executes the process shown in FIG. 17, the pair can be prevented from being created between the P-VOL and the S-VOL corresponding to the same pool. Moreover, although the volumes other than the virtual volume allocated to the same pool is extracted in the step 1704, the parity group ID 143 may be referred to so as to extract a volume other than the virtual volumes allocated to the same parity group.

The virtual volume configuration information 140 may be stored in the memory of the storage system 100 or 130 shown in FIG. 1.

According to this embodiment described above, in the computer system in which the remote copy or the local copy is executed, when the P-VOL and the S-VOL are both virtual volumes and a real area is not allocated to a storage area in the P-VOL, a real area is not allocated to a storage area in the S-VOL corresponding to the storage area in the P-VOL. Therefore, even in the computer system in which the remote copy or the local copy is executed, the storage capacity of the storage system can be efficiently used.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
    a host computer;
    a first storage system coupled to the host computer through a network; and
    a second storage system coupled to the first storage system through the network, wherein:
    the first storage system comprises:
    at least one first interface coupled to the network;
    a first processor coupled to the at least one first interface; and
    at least one first disk drive configured to store data requested to be written from the host computer, and configured to set a first virtual volume, including a plurality of first virtual storage areas, recognized by the host computer as a logical volume and related to a plurality of first real storage areas; wherein:
    the first storage system includes an allocation bitmap indicating whether one of the first real storage areas in the first disk drive is allocated to one of the first virtual storage areas, and
    if the first virtual volume receives data from the host computer, and the first real storage area is not allocated to one of the first virtual storage areas in the first virtual volume, the first processor allocates the first real storage area to the first virtual storage area for storing data;
    wherein the second storage system comprises:
    at least one second interface coupled to the network;
    a second processor coupled to the at least one second interface; and
    at least one second disk drive configured to store data transferred from the first storage system, and configured to set a second virtual volume as a copy pair of the first virtual volume, including a plurality of second virtual storage areas related to a plurality of second real storage areas; wherein:
    the second storage system includes a differential information map indicating whether data is written in one of the second virtual storage area when the copy pair is in a suspend state,
    the first processor decides whether one of the first real storage areas is allocated to each of the first virtual storage areas on the basis of the allocation bitmap, and, if it is decided that one of the first real storage areas is allocated to one of the first virtual storage areas, data stored in the first real storage area allocated to the first virtual storage area is transferred to the second storage system through the first interface,
    if the second storage system receives data from the first storage system, and one of the second real storage areas in the second disk drive is not allocated to the second virtual storage area in the second virtual volume corresponding to the first virtual storage area, the second processor allocates one of the second real storage areas to the second virtual storage area for storing the transferred data; and
    when a copy process from the first virtual volume to the second virtual volume is executed, the first processor receives information from the differential information map of the second storage system to decide whether data is written in the second virtual storage area when the copy pair is in a suspend state, if data is written in the second virtual storage area when the copy pair is in the suspend state, the first processor decides whether the first real storage area is allocated to the first virtual storage area corresponding to the second virtual storage area on the basis of the allocation bitmap, and if the first real storage area is not allocated to the first virtual storage area corresponding to the second virtual storage area, the first processor instructs the second storage system to release the second real storage area allocated to the second virtual storage area.

2. The computer system according to claim 1, wherein the first storage system further comprises a first memory coupled to the first processor;

wherein the second storage system further comprises a second memory coupled to the second processor and wherein:

the first memory includes a differential information map containing differential information indicating whether data stored in the first real storage area allocated to one of the first virtual storage areas is required to be transferred to the second storage system during an initial copy process, the allocation bitmap being controlled to indicate that the first real storage area has been allocated to one of the first virtual storage areas after the write request to the one of the first virtual storage areas has been commanded from the host computer and after the first real storage area has been allocated to the one of the first virtual storage areas;

the first processor refers to the allocation bitmap and updates the differential information in the differential information map by superposition of the differential information map on the allocation bitmap when the first real storage area has been allocated to at least a part of the first virtual storage area corresponding to the differential information, wherein the second storage system also includes a second real storage area which is allocated during the initial copy process to at least one of the second virtual storage areas which corresponds to the one of the first virtual storage areas including data indicated as being required to be transferred during the initial copy process to the second storage system in the differential information map stored in the first memory of the first storage system after the differential information map has been updated by the allocation bitmap.

3. The computer system according to claim 2, wherein the first processor decides whether or not the differential information is valid, and when the differential information is valid, transfers the data stored in the first real storage area allocated to the first virtual storage area corresponding to the differential information to the second storage system through the first interface.

4. The computer system according to claim 3, wherein:

the second logical volume comprises a plurality of second storage areas corresponding to the plurality of first virtual storage areas; and the second processor allocates a second real storage area on the second disk drive to the second storage area corresponding to one of the first storage areas corresponding to the data transferred by the first processor from the first storage system and stores the data transferred from the first storage system to the allocated second real storage area.

5. The computer system according to claim 4, wherein the first processor compares a capacity of a first pool comprising the first real storage area kept to be allocated to the first logical volume and a capacity of a second pool comprising the second real storage area kept to be allocated to the second logical volume, and transfer the data stored in the first real storage area allocated to the first virtual storage area corresponding to the valid differential information to the second storage system through the first interface when the capacity of the first pool is the same as that of the second pool.

6. The computer system according to claim 5, wherein the first processor decides whether or not a capacity is added to the first pool, and when the capacity is added to the first pool, transmits an instruction to add the same amount of capacity as that added to the first pool to the second pool to the second storage system through the first interface.

7. The computer system, according to claim 4, wherein the first processor adds a predetermined capacity to the first pool and transmits an instruction to add the predetermined capacity to the second pool to the second storage system through the first interface.

8. A computer system, comprising:

a host computer;

a first storage system coupled to the host computer through a network; and a second storage system coupled to the first storage system through the network, and a management computer coupled to the first storage system and the second storage system through a management network, wherein:

the first storage system comprises:

at least one first interface coupled to the network;

a first management interface coupled to the management network;

a first processor coupled to the at least one first interface; and at least one first disk drive configured to store data requested to be written from the host computer, and configured to set a first virtual volume, including a plurality of first virtual storage areas, recognized by the host computer as a logical volume and related to a plurality of first real storage areas; wherein;

the first storage system includes an allocation bitmap indicating whether one of the first real storage areas in the first disk drive is allocated to one of the first virtual storage areas, and if the first virtual volume receives data from the host computer, and the first real storage area is not allocated to one of the first virtual storage areas in the first virtual volume, the first processor allocates first real storage area to the first virtual storage area for storing data;

wherein the second storage system comprises:

at least one second interface coupled to the network;

a second processor coupled to the at least one second interface;

and at least one second disk drive configured to store data transferred from the first storage system, and configured to set a second virtual volume as a copy pair of the first virtual volume, including a plurality of second virtual storage areas, related to a plurality of second real storage areas; wherein the second storage system includes a differential information map indicating whether data is written in one of the second virtual storage area when the copy pair is in a suspend state, the first processor decide whether one of the first real storage areas is allocated to each of the first virtual storage areas on the basis of the allocation bitmap, and, if it is decided that one of the first real storage areas is allocated to one of the first virtual storage areas, data stored in the first real storage area allocated to the first virtual storage area is transferred to the second storage system through the first interface, if the second storage system receives data from the first storage system, and one of the second real storage areas in the second disk drive is not allocated to the second virtual storage area in the second virtual volume corresponding to the first virtual storage area, the second processor allocate one of the second real storage areas to the second virtual storage area for storing the transferred data;

when a copy process from the first virtual volume to the second virtual volume is executed, the first processor receives information from the differential information map of the second storage system to decide whether data is written in the second virtual storage area when the copy pair is in a suspend state, if data is written in the second virtual storage area when the copy pair is in the suspend state, the first processor decides whether the first real storage area is allocated to the first virtual storage area corresponding to the second virtual storage area on the basis of the allocation bitmap, and if the first real storage areas is not allocated to the first virtual storage area corresponding to the second virtual storage area, the first processor instructs the second storage system to release the second real storage area allocated to the second virtual storage area volume.

9. The computer system according to claim 8, the first storage further comprises:
a first memory coupled to the first processor;
wherein the second storage system further comprises a second memory coupled to the second processor; and wherein:
the first memory includes a differential information map containing differential information indicating the first virtual storage area from which the data is required to be transferred to the second storage system during an initial copy process, the allocation bitmap being controlled to indicate that the first real storage area has been allocated to one of the first virtual storage areas after the write request to one of the first virtual storage areas has been commanded from the host computer and after the first real storage area has been allocated to the one of the first virtual storage area; and
the first processor refers to the allocation bitmap and updates the differential information in the differential information map by superposition of the differential information map on the allocation bitmap when the first real storage area has been allocated to at least a part of the first virtual storage area corresponding to the differential information, and
wherein the second storage system also includes a second real storage area which is allocated during the initial copy process to at least one of the second virtual storage areas which corresponds to the one of the first virtual storage areas including data indicated as being required to be transferred during the initial copy process to the second storage system in the differential information map stored in the first memory of the first storage system after the differential information map has been updated by the allocation bitmap.

10. The computer system according to claim 9,
wherein the first processor decides whether or not the differential information is valid, and when the differential information is valid, transfers the data stored in the first real storage area allocated to the first virtual storage area corresponding to the differential information to the second storage system through the first interface.

11. The computer system according to claim 10, wherein:
the second logical volume comprises a plurality of second storage areas corresponding to the plurality of first virtual storage areas; and
the second processor allocates a second real storage area on the second disk drive to the second storage area corresponding to the first virtual storage area corresponding to the data transferred by the first processor from the first storage system and stores the data transferred from the first storage system to the allocated second real storage area.

12. The computer system according to claim 11,
wherein the first processor compares a capacity of a first pool comprising the first real storage area kept to be allocated to the first logical volume and a capacity of a second pool comprising the second real storage area kept to be allocated to the second logical volume, transmits information for prompting to add the capacity to the first pool to the management computer through the first management interface when the capacity of the first pool is smaller than that of the second pool, transmits information for prompting to add the capacity to the second pool to the management computer through the first management interface when the capacity of the second pool is smaller than that of the first pool, and transfers the data stored in the first real storage area allocated to the first virtual storage area corresponding to the valid differential information to the second storage system through the first interface when the capacity of the first pool is the same as that of the second pool.

13. The computer system according to claim 12, wherein the first processor decides whether or not a capacity is added to the first pool, and when the capacity is added to the first pool, transmits an instruction to add the same amount of capacity as that added to the first pool to the second pool to the second storage system through the first interface.

14. The computer system according to claim 12, wherein:
the management computer transmits an instruction to add a predetermined capacity to the first pool to the first storage system; and
upon reception of the instruction, the first processor adds the predetermined capacity to the first pool and transmits an instruction to add the predetermined capacity to the second pool to the second storage system through the first interface.

15. The computer system according to claim 12, wherein:
the management computer transmits an instruction to add a predetermined capacity to the first pool and the second pool to the first storage system and the second storage system;
upon receipt of the instruction, the first processor adds the predetermined capacity to the first pool; and
upon reception of the instruction, the second processor adds the predetermined capacity to the second pool.

16. A control method for a computer system which comprises: a host computer; a first storage system coupled to the host computer through a network; and a second storage system coupled to the first storage system through the network, wherein the first storage system comprises at least one first disk drive configured to store data requested to be written from the host computer, and configured to set a first virtual volume, including a plurality of first virtual storage areas, recognized by the host computer as a logical volume and related to a plurality of first real storage areas, and wherein the second storage system comprises at least one second disk drive configured to store data transferred from the first storage system, and configured to set a second virtual volume as a copy pair of the first virtual volume, including a plurality of second virtual storage areas, and related to a plurality of second real storage areas, wherein the first storage system includes an allocation bitmap indicating whether one of the first real storage areas in the first disk drive is allocated to one of the first virtual storage areas, and the second storage system includes a differential information map indicating whether data is written in one of the second virtual storage area when the copy pair is in a suspend state,
  wherein the control method comprises:
    if the first virtual volume receives data form the host computer, and the first real storage area is not allocated to one of the first virtual storage areas in the first virtual volume, allocating, via the first processor the first real storage area to the first virtual storage area for storing data;
    deciding, via the first processor, whether one of the first real storage areas is allocated to each of the first virtual storage areas on the basis of the allocation bitmap, and, if it is decided that one of the first real storage areas is allocated to one of the first virtual storage areas, transferring data stored in the first real storage area allocated to the first virtual storage area to the second storage system through the first interface,
    if the second storage system receives data from the first storage system, and one of the second real storage areas in the second disk drive is not allocated to the second virtual storage area in the second virtual volume corresponding to the first virtual storage area, allocating, via the second processor, one of the second real storage areas to the second virtual storage area for storing the transferred data; and
    when a copy process from the first virtual volume to the second virtual volume is executed, the first processor receives information from the differential information map of the second storage system to decide whether data is written in the second virtual storage area when the copy pair is in a suspend state,
    if data is written in the second virtual storage area when the copy pair is in the suspend state, the first processor decides whether the first real storage area is allocated to the first virtual storage area corresponding to the second virtual storage area on the basis of the allocation bitmap, and
    if the first real storage areas is not allocated to the first virtual storage area corresponding to the second virtual storage area, instructing, via the first processor, the second storage system to release the second real storage area allocated to the second virtual storage area.

17. The control method for a computer system according to claim 16,
  wherein a first memory in the first storage systems includes an includes the allocation bitmap indicating whether or not the first real storage area is allocated to each of the first virtual storage areas and further includes a differential information map containing differential information indicating one of the first virtual storage areas from which the data is required to be transferred to the second storage system during an initial copy process, the allocation bitmap being controlled to indicate that the first real storage area has been allocated to one of the first virtual storage areas after the write request to the one of the first virtual storage areas has been commanded from the host computer and after the first real storage area has been allocated to the one of the first virtual storage areas,
  the control method further comprising:
    referring to the area management information; and
    updating the differential information in the differential information map by superposition of the differential information map on the allocation bitmap when the first real storage area has been allocated to at least a part of the first virtual storage area corresponding to the differential information,
  wherein the second storage system also includes one of the second real storage areas which is allocated during the initial copy process to at least one of the second virtual storage areas which corresponds to the one of the first virtual storage areas including data indicated as being required to be transferred during the initial copy process to the second storage system in the differential information map stored in the first memory of the first storage system after the differential information map has been updated by the allocation bitmap.

18. The control method according to claim 17, further comprising:
  deciding whether or not the differential information is valid; and
  transferring, when the differential information is valid, the data stored in the first real storage area allocated to the first virtual storage area corresponding to the differential information to the second storage system.

19. The control method according to claim 18,
  wherein the second logical volume comprises a plurality of second storage areas corresponding to the plurality of first virtual storage areas;
  the control method further comprising:
  allocating one of the second real storage areas on the second disk drive to the second storage area corresponding to the first virtual storage area corresponding to the data transferred from the first storage system; and
  storing the data transferred from the first storage system to the allocated second real storage area.

* * * * *